US012568468B2

(12) United States Patent
Liu et al.

(10) Patent No.: US 12,568,468 B2
(45) Date of Patent: Mar. 3, 2026

(54) METHODS, DEVICES, AND SYSTEMS FOR SMALL DATA TRANSMISSION

(71) Applicant: ZTE Corporation, Shenzhen (CN)

(72) Inventors: Zhuang Liu, Shenzhen (CN); Zijiang Ma, Shenzhen (CN); Dapeng Li, Shenzhen (CN); Yin Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 307 days.

(21) Appl. No.: 18/493,398

(22) Filed: Oct. 24, 2023

(65) Prior Publication Data

US 2024/0064703 A1     Feb. 22, 2024

Related U.S. Application Data

(63) Continuation of application No. PCT/CN2022/088860, filed on Apr. 24, 2022.

(51) Int. Cl.
*H04W 68/02* (2009.01)
(52) U.S. Cl.
CPC .................................... *H04W 68/02* (2013.01)
(58) Field of Classification Search
CPC . H04W 68/02; H04W 68/005; H04W 88/085; H04W 76/27; H04W 72/1268; Y02D 30/70
USPC ................................ 455/458, 422.1; 370/328
See application file for complete search history.

(56) References Cited

U.S. PATENT DOCUMENTS

| | | | |
|---|---|---|---|
| 2018/0270894 A1 | 9/2018 | Park et al. | |
| 2019/0159168 A1 | 5/2019 | Wang et al. | |
| 2020/0053791 A1 | 2/2020 | Ozturk et al. | |
| 2022/0046749 A1* | 2/2022 | Lin | H04W 76/30 |
| 2023/0217532 A1* | 7/2023 | Kim | H04W 8/00 |
| | | | 455/458 |
| 2023/0247721 A1* | 8/2023 | Kim | H04W 76/30 |
| | | | 370/329 |
| 2023/0262818 A1* | 8/2023 | Kim | H04W 76/19 |
| | | | 370/328 |
| 2023/0284289 A1* | 9/2023 | Watts | H04W 76/19 |
| | | | 370/329 |
| 2024/0215097 A1* | 6/2024 | Ock | H04W 76/30 |

(Continued)

FOREIGN PATENT DOCUMENTS

CN          112534901 A        3/2021

OTHER PUBLICATIONS

European Patent Office Office Action issued in Application No. 22 938 839.2 dated Aug. 13, 2025 (5 pages).

(Continued)

*Primary Examiner* — Juan A Torres
(74) *Attorney, Agent, or Firm* — Crowell & Moring LLP

(57) ABSTRACT

Methods, system, and devices for configuring small data transmission in a telecommunication system are described. The method includes performing, by a first network node, a small data transmission (SDT) transmission to a user equipment (UE) by sending, by the first network node, a paging message to a second network node, the paging message configured to request the second network node to page the UE for the SDT transmission, wherein the paging message comprises SDT information, and the second network node pages the UE according to the SDT information.

12 Claims, 14 Drawing Sheets

(56) References Cited

U.S. PATENT DOCUMENTS

| 2024/0373497 A1* | 11/2024 | Dai | H04W 28/0273 |
| 2024/0407049 A1* | 12/2024 | Kim | H04W 76/27 |
| 2025/0048474 A1* | 2/2025 | Kim | H04W 76/19 |
| 2025/0048475 A1* | 2/2025 | Kim | H04W 76/27 |
| 2025/0056646 A1* | 2/2025 | Yue | H04W 76/20 |
| 2025/0193959 A1* | 6/2025 | Chen | H04W 72/23 |
| 2025/0220763 A1* | 7/2025 | Wu | H04W 76/27 |

OTHER PUBLICATIONS

International Search Report and Written Opinion regarding PCT/CN2022/088860 dated Nov. 29, 2022.
Xiaomi Communications, "Paging reception during SDT," 3GPP TSG-RAN WG2 Meeting #116 electronic R2-2110668, Nov. 12, 2021.
Extended European Search Report and Written Opinion regarding EP 22 93 8839 dated Oct. 31, 2024, 8 pages.
European Patent Office Office Action regarding Application No. 22 938 839.2 dated Jun. 12, 2025 (4 pages).

* cited by examiner

Processor(s) 321

Memories 322

Operating System 324

Instructions 326

Parameters 328

Communication Interfaces 302

Antenna(s) 314

Tx / Rx Circuitry 316

BT/WLAN/NFC
2G/3G/4G/LTE/5G

System Circuitry 304

I/O Interfaces 306

Display Circuitry 308

User interfaces 310

Storage 309

300

400 sending, by the first network node, a paging message to a second network node, the paging message configured to request the second network node to page the UE for the SDT transmission, wherein the paging message comprises SDT information, and the second network node pages the UE according to the SDT information

450 receiving, by the second network node, a paging message from a first network node, the paging message configured to request the second network node to page the UE for the SDT transmission, wherein the paging message comprises SDT information, and the second network node pages the UE according to the SDT information

Figures 4A, 4B:
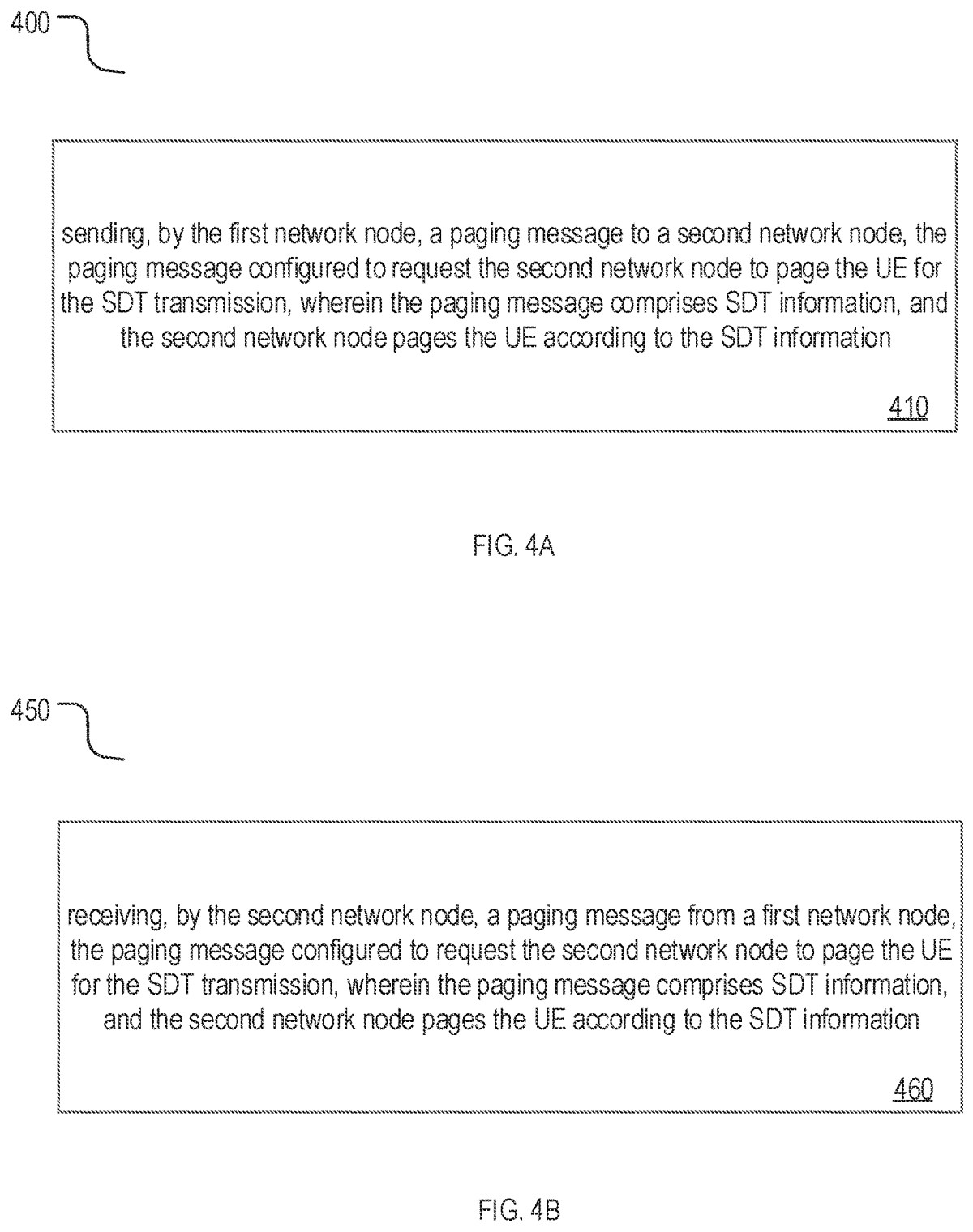

460

FIG. 4B 691 gNB-CU-CP 692 gNB-CU-UP

Option 1
610

601a.1 GNB-CU-UP CONFIGURATION UPDATE 601a.2 GNB-CU-UP CONFIGURATION UPDATE
ACKNOWLEDGE with SDT trigger parameters

Option 2
620

601b.1 GNB-CU-CP CONFIGURATION UPDATE
with SDT trigger parameters 601b.2 GNB-CU-CP CONFIGURATION UPDATE
ACKNOWLEDGE 602 store SDT trigger
parameter 791 — gNB-CU-CP 792 — gNB-CU-UP 701 BEARER CONTEXT SETUP REQUEST
with SDT trigger parameters of SDT bearer

702 BEARER CONTEXT SETUP RESPONSE 703 store SDT trigger
parameters of the
corresponding SDT
bearer of the UE

METHODS, DEVICES, AND SYSTEMS FOR SMALL DATA TRANSMISSION

CROSS-REFERENCE TO RELATED APPLICATION

This application is a continuation application of PCT International Patent Application No. PCT/CN2022/088860, filed with the China National Intellectual Property Administration, PRC on Apr. 24, 2022, which is herein incorporated by reference in its entirety.

TECHNICAL FIELD

The present disclosure is directed generally to wireless communications. Particularly, the present disclosure relates to methods, devices, and systems for small data transmissions when a user equipment device is in an inactive state.

BACKGROUND

Wireless communication technologies are moving the world toward an increasingly connected and networked society. High-speed and low-latency wireless communications rely on efficient network resource management and allocation between user equipment and wireless access network nodes (including but not limited to base stations). A new generation network is expected to provide high speed, low latency and ultra-reliable communication capabilities and fulfill the requirements from different industries and users.

With the rapid evolution of cellular mobile communication systems, a wireless network supports various types of services having different requirements for data packet transmission. These requirements include, for example, payload size, transmission latency, transmission reliability, transmission priority, and the like. When a User Equipment (UE) is in inactive or idle mode, it is critical for the UE to reduce power consumption while still being able to support data transmission with efficient radio resource utilization, particularly for to-be-transmitted data having a relatively small size.

The present disclosure describes various embodiments for configuring small data transmission, which may address at least one of issues/problems associated with the existing system, particularly solving the issues/problems related to the downlink small data transmission, thus decreasing the load on radio access network, lowering energy consumption of the UE, and improving the efficiency and/or performance of the wireless communication.

SUMMARY

This document relates to methods, systems, and devices for wireless communication, and more specifically, for configuring small data transmission when a user equipment device is in an inactive or idle state. Various embodiments in the present disclosure may increase the resource utilization efficiency, boost latency performance of the wireless communication, conserve energy consumption of user equipment.

In one embodiment, the present disclosure describes a method for wireless communication. The method includes performing, by a first network node, a small data transmission (SDT) transmission to a user equipment (UE) by, by the first network node, a paging message to a second network node, the paging message configured to request the second network node to page the UE for the SDT transmission, wherein the paging message comprises SDT information, and the second network node pages the UE according to the SDT information.

In one embodiment, the present disclosure describes a method for wireless communication. The method includes performing, by a second network node, a small data transmission (SDT) transmission to a user equipment (UE) by receiving, by the second network node, a paging message from a first network node, the paging message configured to request the second network node to page the UE for the SDT transmission, wherein the paging message comprises SDT information, and the second network node pages the UE according to the SDT information.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4A shows a flow diagram of a method for wireless communication.

FIG. 4B shows a flow diagram of another method for wireless communication.

DETAILED DESCRIPTION

Figure 1A:
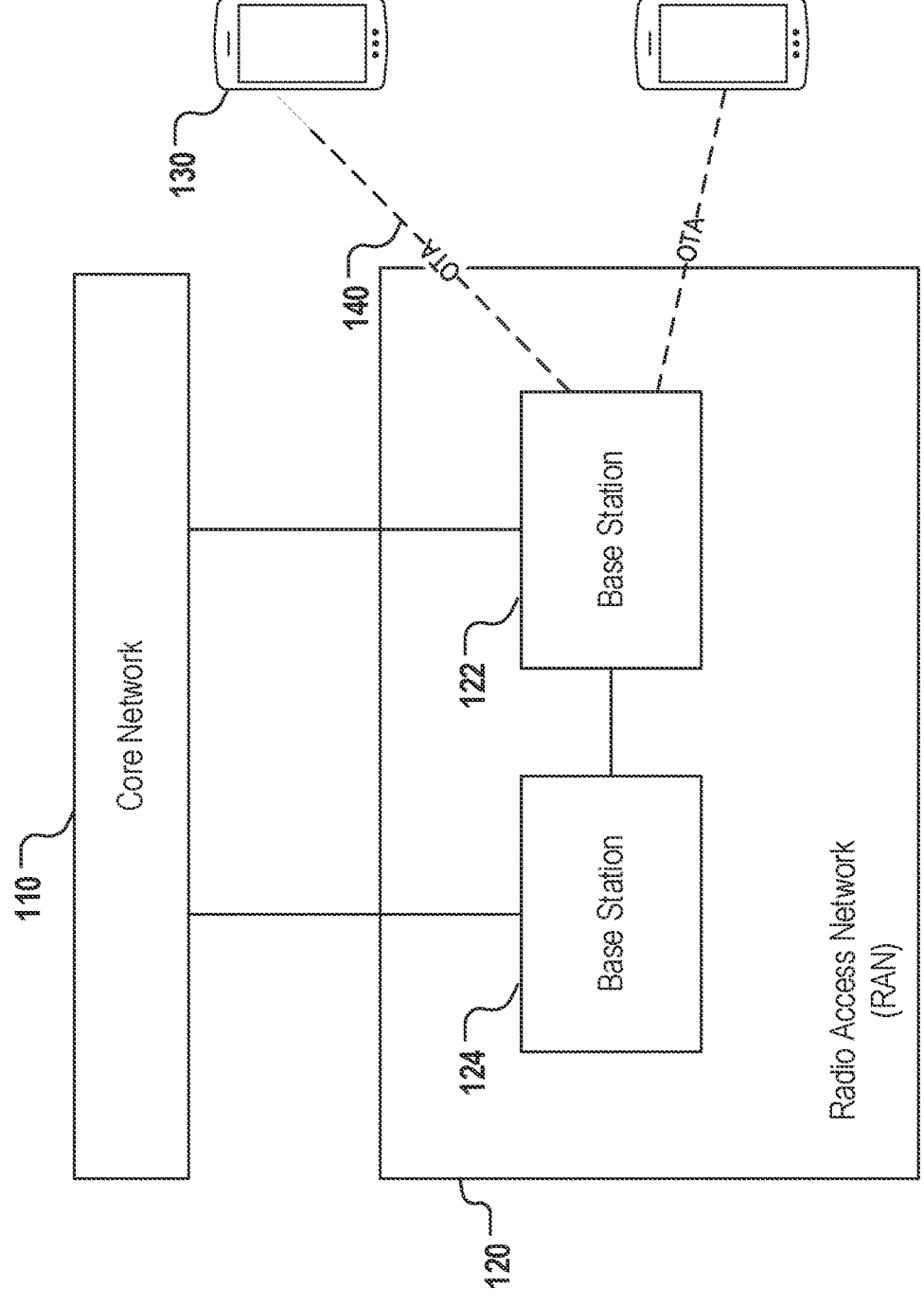
FIG. 1A shows a schematic diagram of a wireless communication system.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

With the development of intelligent terminals (e.g., user equipment (UE)) and internet of things (IoT) terminals, a number of users of some instant messaging services such as WeChat, twitter, QQ message and other applications is increasing. Such services are usually online all the time, and are mainly for small data transmission (SDT), such as text messages. Traditionally, the transmission of user data is not allowed when in an inactive state. Even for the transmission of a very small amount of data the device has to resume the connection, which may have a negative impact on signaling overhead as well as device energy consumption. Since the small data volume service requires the UE to frequently re-establish the signaling link with the RAN radio network, it causes problems such as increased signaling load on the RAN and the energy consumption on the UE becomes larger.

In some implementations, the transmission of small data payloads (i.e. SDT) may be made in an inactive state. For new radio (NR) specifications the UE may have three states: idle, inactive and connected. The UE cannot transmit data in idle and inactive, so when UE wants to transmit data in idle or inactive, the UE first transfers to connected. However, for small data transmission (SDT), the UE may transmit small data in an inactive state, rather than transferring to connected first. The version of idle/inactive in which no data can be transferred may be referred to as the legacy state as compared with the states presented here that allow for small data transmission in inactive or idle states.

Any device that has intermittent small data packets in an inactive state may benefit from enabling small data transmission (SDT) while in an inactive state. SDT traffic may have different service requirements as compared to conventional or larger data transmission traffic types. SDT communication or data transfer may be made from/with the UE while in an inactive state. The UE may send an SDT request message to a base station, which may be a nodeB (NB, e.g., an eNB or gNB) in a mobile telecommunications context. The base station may respond to the UE request message with a reply that includes an SDT indication. The SDT indication signals that communication may be made from the UE even in an inactive state. Small data transmissions while in an inactive state may save power and reduce signaling overhead.

In some implementations, the SDT communications may coexist with legacy mixed traffic on the same carrier, while improving usage of network resources (power, codes, interference, etc.) for the SDT communications. Examples of small and infrequent data traffic that would qualify for SDT include smartphone applications, such as 1) traffic from Instant Messaging services (e.g., whatsapp, QQ, wechat, etc.); 2) heart-beat/keep-alive traffic from IM/email clients and other apps; and 3) push notifications from various applications. In addition, other SDT may include traffic from wearables (periodic positioning information etc.), sensors (e.g., Industrial Wireless Sensor Networks transmitting temperature, pressure readings periodically or in an event triggered manner), and smart meters or smart meter networks sending periodic meter readings.

In various embodiments, small data in SDT may include data with an application packets size of 100s bytes (upload UL or download DL) or lower. Although the examples and embodiments described herein refer to small data or small data transmission, the scope of small data may vary and may include data other than small data, such as normal data or large data. Specifically, the size of small data can vary and the embodiments/examples will apply to any data.

Radio resource control (RRC) is a protocol layer between UE and the base station at the IP level (Network Layer). RRC messages are transported via the packet data convergence protocol (PDCP). As described, UE can transmit infrequent (periodic and/or non-periodic) data in RRC_INACTIVE state without moving to an RRC_CONNECTED state. This can save the UE power consumption and signaling overhead. This can be through a Random Access Channel (RACH) protocol scheme or Configured Grant (CG) scheme.

In some implementations, a UE in RRC inactive state may resume the RRC connection (i.e. transition to RRC Connected state), and then to perform any downlink (DL) and Uplink (UL) data transmission, irrespective of the payload size. In some other implementations, to meet the increasing requirements of latency reduction and energy efficiency, infrequent small packet transmission under SDT enables UEs in RRC inactive state to perform data transmission without requiring transition to an RRC connected state.

In some implementations, SDT is enabled on a radio bearer basis and is initiated by the UE only if less than a configured amount of UL (uplink) data awaits transmission across all radio bearers for which SDT is enabled. In some implementations, only UE may initiate the SDT procedure for UL data, and thus, when infrequent and small amount DL data arrives at the gNB for a UE in RRC inactive state, the gNB may only request a UE to transfer from RRC inactive state to RRC_CONNECTED state for subsequent DL data transmission. Therefore, additional transmission latency for DL SDT data is introduced, and the energy consumption on the UE becomes larger.

The present disclosure described various embodiment for configuring small data transmission, which may be initiated by the base station or core network when infrequent and small amount DL data arrives for a UE in RRC inactive state, addressing at least one of the problems/issues discussed above.

FIG. 1A shows an example cellular wireless communication network 100 (also referred to as wireless communication system) that includes a core network 110, a radio access network (RAN) 120, and one or more user equipment (UE) 130.

The RAN 120 further includes multiple base stations 122 and 124. The base station 122 and one or more user equipment (UE) 130 communicate with one another via Over the Air (OTA) radio communication resources 140. The wireless communication network 100 may be implemented as, as for example, a 2G, 3G, 4G/LTE, or 5G cellular communication network. Correspondingly, the base stations 122 and 124 may be implemented as a 2G base station, a 3G nodeB, an LTE eNB, or a 5G New Radio (NR) gNB. The UE 130 may be implemented as mobile or fixed communication devices installed with SIM/USIM modules for accessing the wireless communication network 100. The one or more UE 130 may include but is not limited to mobile phones, Internet of Things (IoT) devices, Machine-type communications (MTC) devices, laptop computers, tablets, personal digital assistants, wearable devices, distributed remote sensor devices, roadside assistant equipment, and desktop computers. Alternative to the context of cellular wireless network, the RAN 120 and the principles described below may be implemented as other types of radio access networks, such as Wi-Fi, Bluetooth, ZigBee, and WiMax networks.

In the example wireless communication system 100 of FIG. 1A, the one or more UE 130 may connect with and establish a communication session with the base station 122 via the OTA interface 140. The communication session between the UE 130 and the base station 122 may utilize downlink (DL) and/or uplink (UL) transmission resources. The DL transmission resource carries data from the base station 122 to the UE 130, and the UL transmission resource carries data from the UE 130 to the base station 122. Under certain circumstances, for example when the base station 122 is unavailable or when the UE 130 moves into a coverage of the base station 124, the one or more UE 130 may connect with and establish a communication session with the base station 122.

Figure 1B:
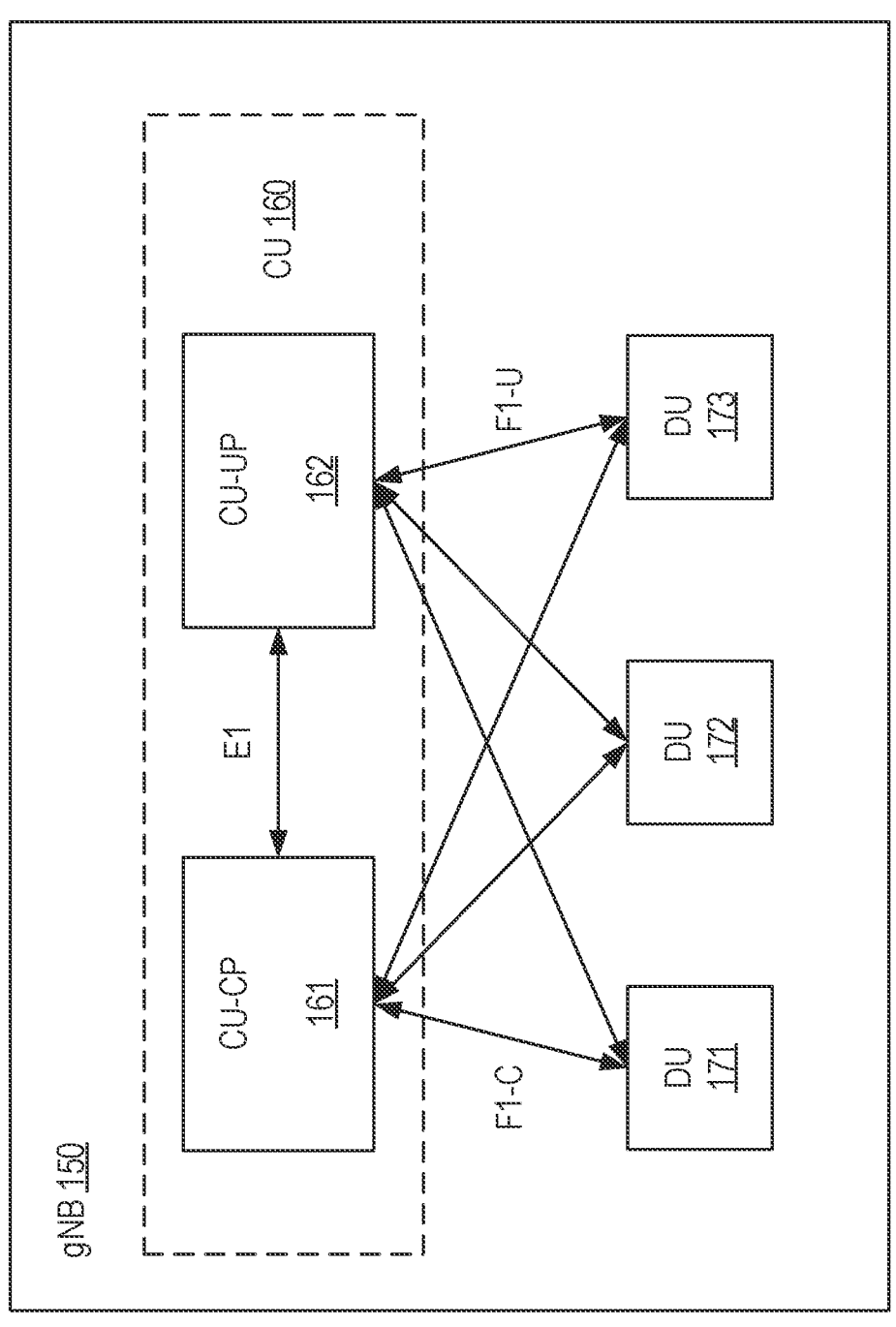
FIG. 1B shows a schematic diagram of a base station.

Referring to FIG. 1B, a base station (e.g., gNB) 150 may have a control-distributed separated structure, which may include a control unit (CU) 160 and one or more distributed unit (DU) 171, 172, and/or 173. The CU may include a control plan (CP) 161 and a user plan (UP) 162. The CP 161 may be referred as CU-CP or gNB-CU-CP, and the UP 162 may be referred as CU-UP or gNB-CU-UP. The CU-CP 161 may communicate with the CU-UP 162 via an E1 interface between them. The CU-CP 161 may communicate with the one or more DU via a F1-C interface, and the CU-UP 162 may communicate with the one or more DU via a F1-U interface.

Figure 2:
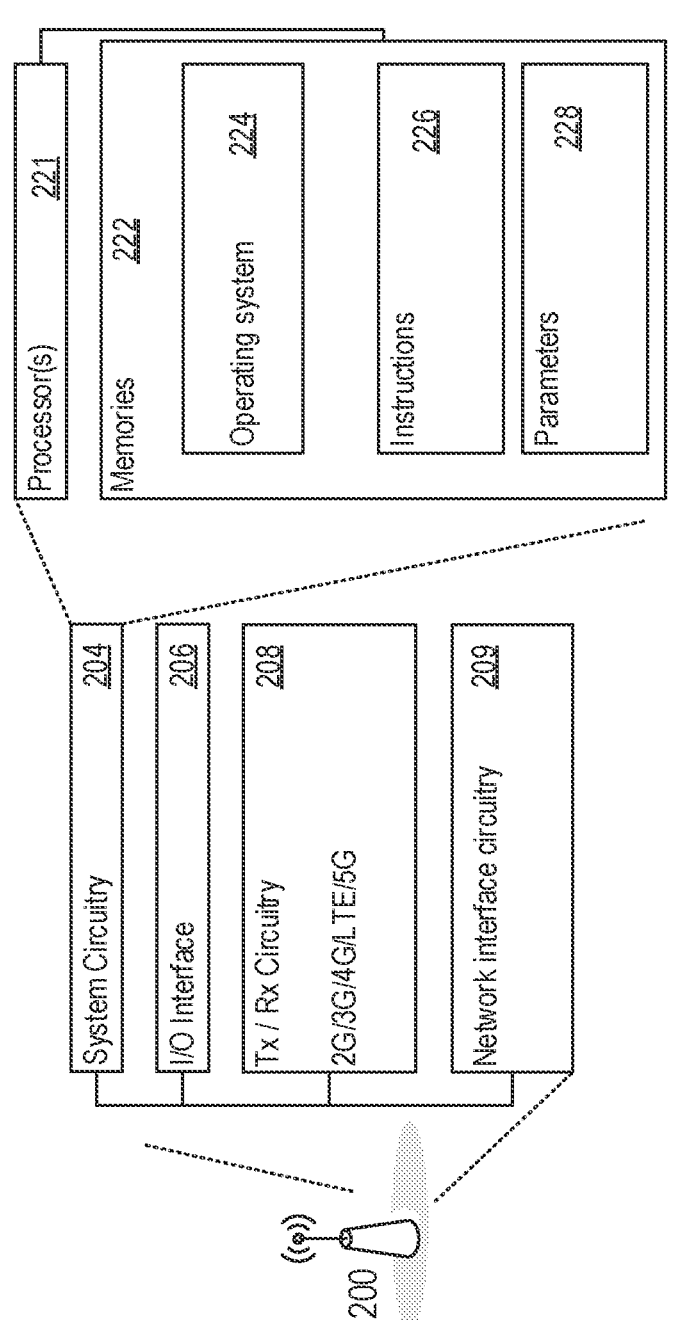
FIG. 2 shows an example of a network node.

FIG. 2 shows an example of electronic device 200 to implement a network base station. The example electronic device 200 may include radio transmitting/receiving (Tx/

Rx) circuitry 208 to transmit/receive communication with UEs and/or other base stations. The electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the network node. The parameters 228 may include parameters to support execution of the instructions 226. For example, parameters may include network protocol settings, bandwidth parameters, radio frequency mapping assignments, and/or other parameters.

Figure 3:
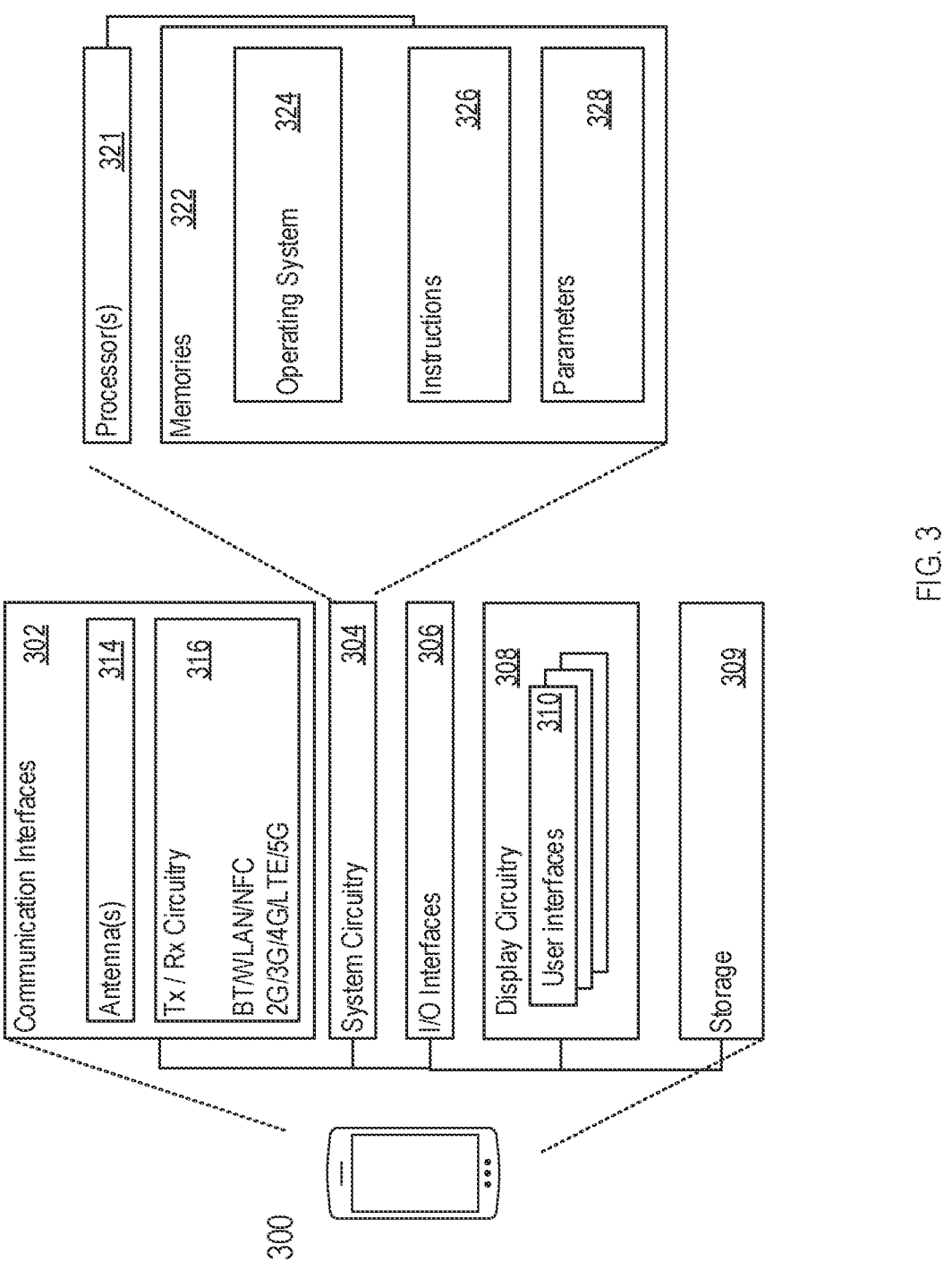
FIG. 3 shows an example of a user equipment.

FIG. 3 shows an example of an electronic device to implement a terminal device 300 (for example, user equipment (UE)). The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), 5G standards, and/or 6G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G, 6G, or other data that the UE 300 will send, or has received, through the communication interfaces 302. In various implementations, a system power for the UE 300 may be supplied by a power storage device, such as a battery or a transformer.

The present disclosure describes various embodiment for configuring small data transmission, which may be implemented, partly or totally, on the network base station and/or the user equipment described above in FIGS. 2-3. The various embodiments in the present disclosure may solve the issues/problems related to the downlink small data transmission, thus decreasing the load on radio access network, lowering energy consumption of the UE, and improving the efficiency and/or performance of the wireless communication.

Referring to FIG. 4A, the present disclosure describes various embodiments of a method 400 for wireless communication. The method 400 may include performing, by a first network node, a small data transmission (SDT) transmission to a user equipment (UE). The method 400 may include: step 410, sending, by the first network node, a paging message to a second network node, the paging message configured to request the second network node to page the UE for the SDT transmission, wherein the paging message comprises SDT information, and the second network node pages the UE according to the SDT information.

Referring to FIG. 4B, the present disclosure describes various embodiments of a method 450 for wireless communication. The method 450 may include performing, by a second network node, a small data transmission (SDT) transmission to a user equipment (UE). The method 450 may include: step 460, receiving, by the second network node, a paging message from a first network node, the paging message configured to request the second network node to page the UE for the SDT transmission, wherein the paging message comprises SDT information, and the second network node pages the UE according to the SDT information.

In various embodiments and/or implementations of the present disclosure, a network node may referred as a network element.

In some implementations, the first network node may be referred as a first network element or a source network element, for example but not limited to, a control unit of a base station. In some implementations, the second network node may be referred as a second network element or a target network element, for example but not limited to, a distributed unit of a base station.

In some implementations, the first network node is a control unit of a base station (gNB-CU) and the second network node is a distributed unit of the base station (gNB-DU); or the first network node is a first gNB and the second network node is a second gNB.

In some implementations, the first network node is the gNB-CU; a control plane entity of the gNB-CU (gNB-CU-CP) sends a message to a user plane entity of the gNB-CU (gNB-CU-UP), the message comprising a SDT trigger parameter; and the SDT trigger parameter comprises at least one of the following: a data volume threshold for the UE, a data volume threshold for a protocol data unit (PDU) session, or a data volume threshold for a bearer configured with the SDT transmission.

In some implementations, the first network node is the gNB-CU; in response to receiving downlink (DL) data, a gNB-CU-UP determines, according to a SDT trigger parameter, whether to use the SDT transmission to transmit the received DL data; and in response to the gNB-CU-UP's determining to use the SDT transmission to transmit the received DL data, the gNB-CU-UP sends a message to a gNB-CU-CP to notify arrival of the DL data, the message comprising SDT information indicating the SDT transmission expected and/or SDT data, wherein the SDT data comprises at least one portion of the received DL data for transmitting to the UE.

In some implementations, the gNB-CU-UP determines, according to the SDT trigger parameter, whether to use the SDT transmission to transmit the received DL data by at least one of the following: in response to the SDT trigger parameter comprising a data volume threshold for the UE and a data volume of the received DL data of all bearers configured with SDT for the UE being no larger than the data volume threshold for the UE, the gNB-CU-UP determines to use the SDT transmission to transmit the received DL data; in response to the SDT trigger parameter comprising a data volume threshold for a PDU session and a data volume of the received DL data of all bearers configured with SDT for the PDU session being no larger than the data volume threshold for the PDU session, the gNB-CU-UP determines to use the SDT transmission to transmit the received DL data; or in response to the SDT trigger parameter comprising a data volume threshold for a bearer and a data volume of the received DL data for the bearer being no larger than the data volume threshold for the bearer, the gNB-CU-UP determines to use the SDT transmission to transmit the received DL data.

In some implementations, the paging message comprises SDT data, wherein the SDT data comprises at least one portion of received DL data for transmitting to the UE.

In some implementations, before the second network pages the UE according to the SDT information, in response to receiving the paging message, the second network node sends a paging early indication (PEI) message to the UE, the PEI message comprises the SDT information indicating the SDT transmission.

In some implementations, the second network node pages the UE according to the SDT information by the second network node sends a radio resource control (RRC) paging message to the UE, the RRC paging message comprising the SDT information indicating the SDT transmission.

In some implementations, in response to receiving a RRC paging message from the second network node, the UE sends a RRC resume request message to the second network node, the RRC resume request message comprising a SDT indicator to request resuming the UE in an inactive state for the SDT transmission.

In some implementations, a core network (CN) sends a message to the first network node for requesting to transfer a non-access stratum (NAS) PDU to the UE, the message comprising one of a single NAS PDU indicator indicating that no subsequent NAS PDU transmission is expected or a multiple NAS PDU indicator indicating that at least one subsequent NAS PDU transmission is expected.

In some implementations, the message comprises a downlink NAS transport message.

In some implementations, the first network node is the gNB-CU; and the gNB-CU-CP determines whether to relocate a UE context to a neighbour gNB according to the SDT information received from the gNB-CU-UP by in response to the UE subsequently resuming at the neighbour gNB and the SDT information comprising a multiple-packet indicator, the gNB-CU-CP determines to relocate the UE context to the neighbour gNB.

In some implementations, the SDT information comprises at least one of the following: a SDT indicator indicating that the SDT transmission is expected; a single-packet indicator indicating that no subsequent SDT transmission is expected; or a multiple-packets indicator indicating that at least one subsequent SDT transmission is expected.

The present disclosure describes various embodiments with non-limiting exemplary examples for configuring small data transmission (SDT).

Figure 5:
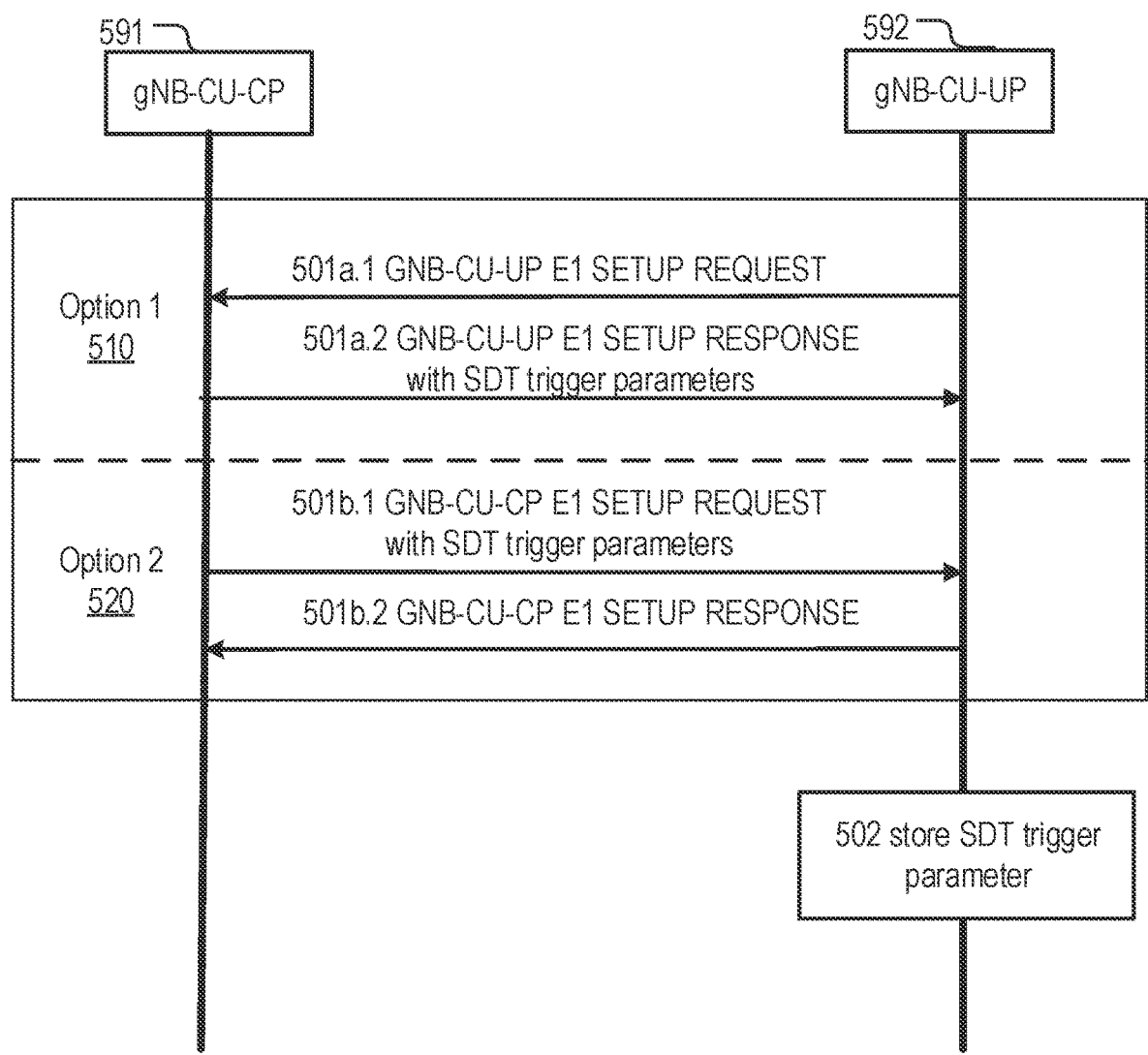
FIG. 5 shows a flow diagram of an exemplary embodiment for wireless communication.

I: Embodiments of Configuring SDT Trigger Parameters for Multiple UEs at gNB-CU-UP Via E1 Setup FIG. 5 shows two options (or alternatives) to configure SDT trigger parameters for multiple UEs at a gNB-CU-UP via E1 interface setup procedures: Option 1, the gNB-CU-UP initiate the E1 setup procedure; and Option 2, the gNB-CU-CP initiates the E1 setup procedure. The E1 interface may be referred to the interface between a gNB-CU-CP and a gNB-CU-UP.

Regarding Option 1 (510), in step 501*a*.1, a gNB-CU-UP 592 initiates an E1 interface setup procedure by sending a GNB-CU-UP E1 SETUP REQUEST message to a gNB-CU-CP 591. In step 501*a*.2, after receiving the GNB-CU-UP E1 SETUP REQUEST message, the gNB-CU-CP sends a GNB-CU-UP E1 SETUP RESPONSE message to gNB-CU-UP including the SDT trigger parameters. The SDT trigger parameters at least includes a configured data volume threshold for the UE, or for the PDU session, or for the bearer configured with SDT. Then, the E1 interface is successfully established to exchange application level data needed for the gNB-CU-UP and the gNB-CU-CP.

Regarding Option 2 (520), in step 501*b*.1, the gNB-CU-CP initiates the E1 interface setup procedure by sending a GNB-CU-CP E1 SETUP REQUEST message including the SDT trigger parameters to the gNB-CU-UP, where the SDT trigger parameters at least includes a configured data volume threshold for the UE, or for the PDU session, or for the bearer configured with SDT. In step 501*b*.2, after receiving the GNB-CU-CP E1 SETUP REQUEST message, the gNB-CU-UP sends a GNB-CU-CP E1 SETUP RESPONSE message to the gNB-CU-CP, and then the E1 interface is successfully established to exchange application level data needed for the gNB-CU-UP and the gNB-CU-CP.

After either option 1 or Option 2, in step 502, the GNB-CU-UP stores the received SDT trigger parameters for UEs served by the gNB-CU-UP.

Figure 6:
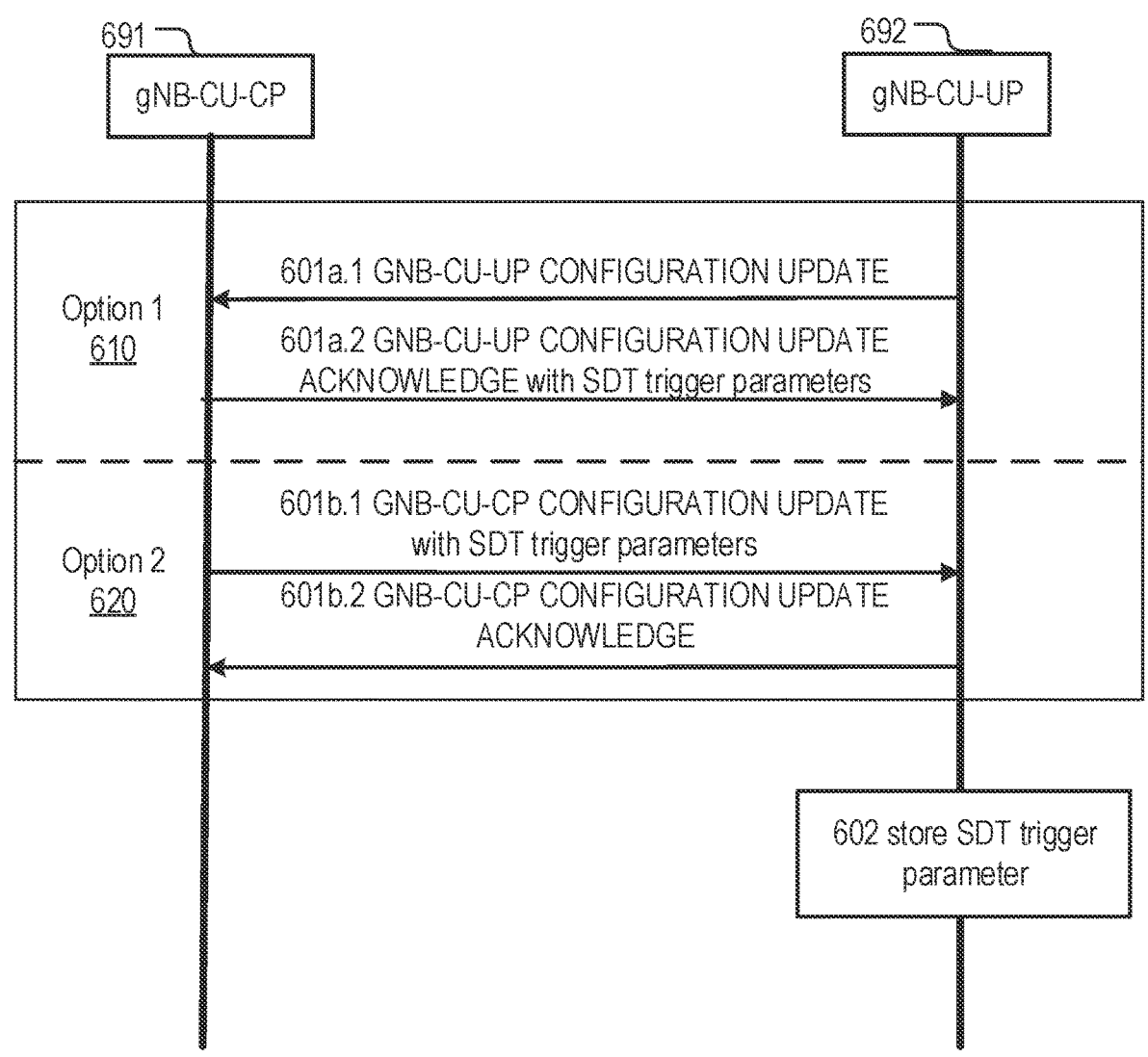
FIG. 6 shows a flow diagram of an exemplary embodiment for wireless communication.

II. Embodiments of Configuring SDT Trigger Parameters for Multiple UEs at gNB-CU-UP Via E1 Modification FIG. 6 shows two options (or alternatives) to configure SDT trigger parameters for multiple UEs at gNB-CU-UP via E1 interface modification procedures: Option 1, the gNB-CU-UP initiate the E1 modification procedure; and Option 2, the gNB-CU-CP initiates the E1 modification procedure. The E1 interface may be referred to the interface between a gNB-CU-CP and a gNB-CU-UP.

Regarding Option 1 (610), in step 601*a*.1, a gNB-CU-UP 692 initiates the E1 modification procedure by sending a GNB-CU-UP CONFIGURATION UPDATE message to a gNB-CU-CP 691. In step 601*a*.2, after receiving the GNB-CU-UP CONFIGURATION UPDATE message, the gNB-CU-CP sends GNB-CU-UP CONFIGURATION UPDATE ACKNOWLEDGE message to the gNB-CU-UP including the SDT trigger parameters, where the SDT trigger parameters at least includes a configured data volume threshold for the UE, or for the PDU session, or for the bearer configured with SDT. Then, the E1 interface is successfully modified to exchange application level data needed for the gNB-CU-UP and the gNB-CU-CP.

Regarding Option 2 (620), in step 601*b*.1, the gNB-CU-CP initiates the E1 modification procedure by sending a GNB-CU-CP CONFIGURATION UPDATE message including the SDT trigger parameter to the gNB-CU-UP, where the SDT trigger parameters at least includes a configured data volume threshold for the UE, or for the PDU session, or for the bearer configured with SDT. In step 601*b*.2, after receiving the GNB-CU-CP CONFIGURATION UPDATE message, the gNB-CU-UP sends a GNB-CU-CP CONFIGURATION UPDATE ACKNOWLEDGE message to gNB-CU-CP, and then the E1 interface is successfully modified to exchange application level data needed for the gNB-CU-UP and the gNB-CU-CP.

After either option 1 or Option 2, in step 602, the GNB-CU-UP stores the received SDT trigger parameters for UEs served by the gNB-CU-UP.

Figure 7:
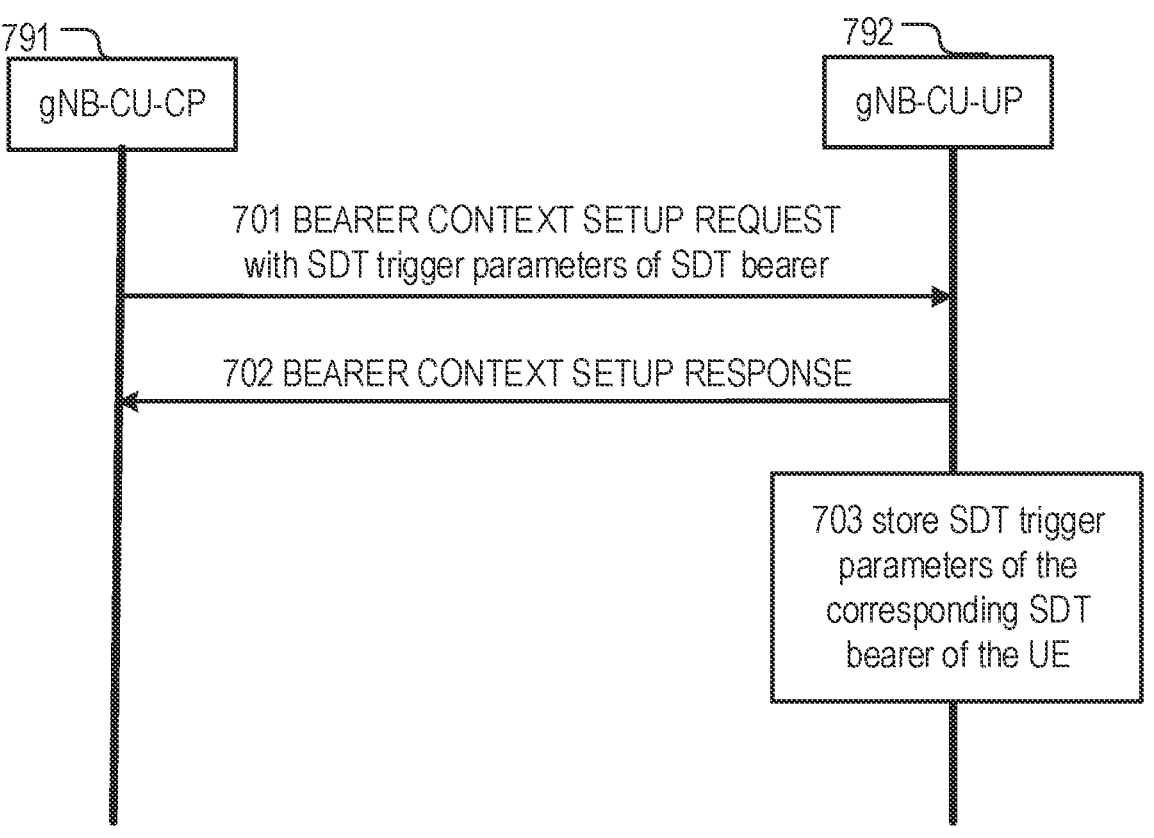
FIG. 7 shows a flow diagram of an exemplary embodiment for wireless communication.

III. Embodiments of Configuring SDT Trigger Parameters for UE at gNB-CU-UP Via Bearer Context Setup FIG. 7 shows a non-limiting example of configuring SDT trigger parameters for a UE at a gNB-CU-UP via a bearer context setup. In step 701, a gNB-CU-CP 791 sends the BEARER CONTEXT SETUP REQUEST message to a gNB-CU-UP 792 to request the gNB-CU-UP to establish the requested resources for the UE, including the SDT trigger parameters of such UE in the message, where the SDT trigger parameters at least includes a configured data volume threshold for the UE, or for the PDU session, or for the bearer configured with SDT. In step 702, after receiving the BEARER CONTEXT SETUP REQUEST message, the gNB-CU-UP may establish the requested resources for the UE, and sends BEARER CONTEXT SETUP RESPONSE message to gNB-CU-CP. In step 703: the GNB-CU-UP stores the received SDT trigger parameters of the UE.

Figure 8:
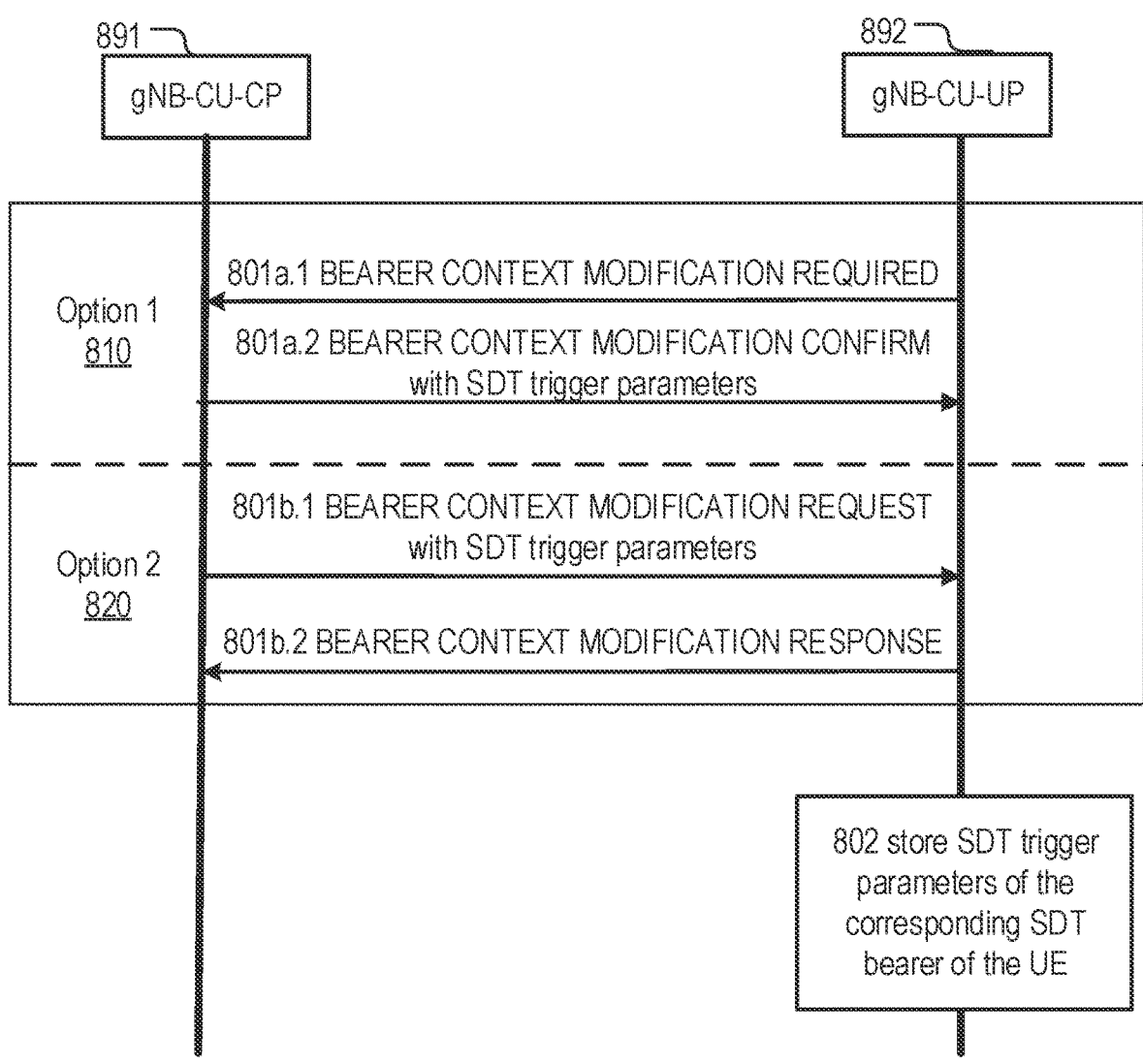
FIG. 8 shows a flow diagram of an exemplary embodiment for wireless communication.

IV. Embodiments of Configuring SDT Trigger Parameters for UE at gNB-CU-UP Via Bearer Context Modification FIG. 8 shows two options (or alternatives) to configure SDT trigger parameters for a UE at a gNB-CU-UP via bearer modification procedures: Option 1, the gNB-CU-UP initiate the bearer modification procedure; and Option 2, the gNB-CU-CP initiates the bearer modification procedure.

Regarding Option 1 (810), in step 801a.1, a gNB-CU-UP 892 sends a BEARER CONTEXT MODIFICATION REQUIRED message to a gNB-CU-CP 891 to modify the bearer configuration of the UE. In step 801a.2, after receiving the BEARER CONTEXT MODIFICATION REQUIRED message, the gNB-CU-CP modifies the bearer configuration and sends a BEARER CONTEXT MODIFICATION CONFIRM message to the gNB-CU-UP including the SDT trigger parameters of such UE, where the SDT trigger parameters at least includes a configured data volume threshold for the UE, or for the PDU session, or for the bearer configured with SDT.

Regarding Option 2 (820), in step 801b.1, the gNB-CU-CP sends the BEARER CONTEXT MODIFICATION REQUEST message to the gNB-CU-UP to request gNB-CU-UP to modify the requested resources for the UE, including the SDT trigger parameters of such UE in the message, where the SDT trigger parameters at least includes a configured data volume threshold for the UE, or for the PDU session, or for the bearer configured with SDT. In step 801b.2, after receiving the BEARER CONTEXT MODIFICATION REQUEST message, the gNB-CU-UP may modify the requested resources for the UE, and sends a BEARER CONTEXT MODIFICATION RESPONSE message to the gNB-CU-CP.

After either option 1 or Option 2, in step 802, the GNB-CU-UP stores the received SDT trigger parameters of the UE.

V. Embodiments for Transmitting Downlink (DL) SDT Triggered by gNB-CU-UP

Figure 9:
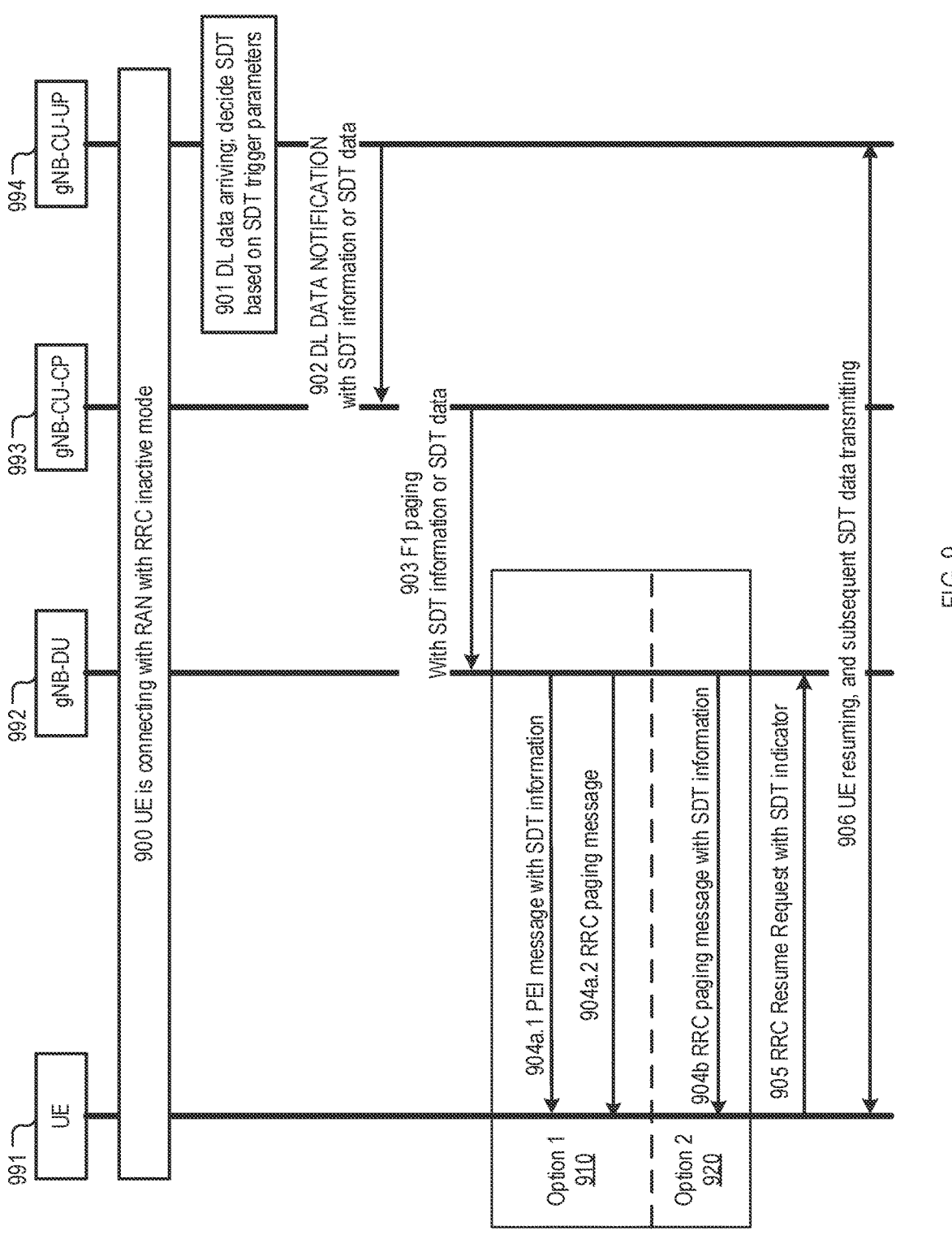
FIG. 9 shows a flow diagram of an exemplary embodiment for wireless communication.

FIG. 9 shows a non-limiting exemplary example for initiating and transmitting a downlink (DL) SDT triggered by a gNB-CU-UP.

Referring to step 900, a UE 991 is connecting with an RAN with an RRC inactive mode (i.e., the UE is in a RRC inactive state). The RAN may include one or more gNB-DU 992, one or more gNB-CU-CP 993, and one or more gNB-CU-UP 994.

Referring to step 901, when DL data of the bearer(s) configured with SDT arrives for the UE in RRC inactive state, the gNB-CU-UP determines whether to use SDT transmission or not for the UE according to the stored SDT trigger parameters. The SDT trigger parameter may be obtained and/or stored as described in the previous embodiments in the present disclosure.

When a configured data volume threshold for the UE is present, the gNB-CU-UP may determine to use SDT transmission when the arrived data volume of all bearer(s) configured with SDT of such UE is less than (or no larger than) the corresponding configured threshold.

When a configured data volume threshold for a PDU session is present, the gNB-CU-UP may determine to use SDT transmission when the arrived data volume of all bearer(s) configured with SDT of such PDU session is less than (or no larger than) the corresponding configured threshold.

When a configured data volume threshold for a bearer configured with SDT is present, the gNB-CU-UP may determine to use SDT transmission when the arrived data volume of such SDT bearer is less than (or no larger than) the corresponding configured threshold.

Referring to step 902, when the gNB-CU-UP determines to use SDT transmission for the UE, the gNB-CU-UP sends a DL DATA NOTIFICATION message to the gNB-CU-CP to inform the DL data arriving. The DL DATA NOTIFICATION message may include SDT information to request resuming UE for SDT transmission. The SDT information includes at least one of the following items: an SDT indicator to indicate that SDT transmission is expected; a single packet indicator to indicate that no subsequent SDT transmission is expected; a multiple-packet indicator to indicate that subsequent SDT transmission is expected.

In some implementations, the gNB-CU-UP may decide the items of the SDT information. For example, the gNB-CU-UP may include SDT indicator when it decides to use SDT transmission; the gNB-CU-UP may include a single packet indicator when only one packet is needed to be transmitted to the UE; the gNB-CU-UP may include a multiple-packet indicator when multiple packets are needed to be transmitted to the UE.

Optionally in some implementations, the gNB-CU-UP may includes some SDT data (e.g., packet data convergence protocol (PDCP) PDU(s) for the bearer(s) configured with SDT) that is needed to be transmitted to the UE into the DL DATA NOTIFICATION message.

Referring to step 903, after receiving the DL DATA NOTIFICATION message, when the SDT information is present in the DL DATA NOTIFICATION message, the gNB-CU-CP sends an F1 paging message to the gNB-DU to inform the DU to page the corresponding UE for SDT transmission. The F1 paging message includes SDT information. The SDT information includes at least one of the following items: an SDT indicator to indicate that SDT transmission is expected; a single packet indicator to indicate that no subsequent SDT transmission is expected; a multiple-packet indicator to indicate that subsequent SDT transmission is expected.

Optionally in some implementations, the gNB-CU-UP may include some SDT data (PDCP PDU(s) for the bearer(s) configured with SDT) received from gNB-CU-UP via the DL DATA NOTIFICATION message into the F1 paging message. In some implementations, the SDT information here may not need to contain all of the SDT information received from the gNB-CU-UP, for example, it may contain only part of the received information, such as only contains an SDT indicator.

In some implementations, the gNB-CU-CP may use the SDT information received from the gNB-CU-UP to decide whether to relocate UE context to a neighbour gNB or not, when UE is subsequently resuming at neighbour gNB. For example, when a multiple-packet indicator is present in the SDT information, the gNB-CU-CP may decide to relocate the UE context to the neighbour gNB.

There may be two options (or alternatives) for the gNB-DU to communicate the SDT information to the UE: Option 1, the gNB-DU includes the SDT information in a paging early indication (PEI) message; and Option 2, the gNB-DU includes the SDT information in a RRC paging message.

Regarding Option 1 (910), in step 904a.1, after receiving an F1 paging message, the gNB-DU sends a PEI message to the UE before paging the UE, including SDT information in the PEI message to indicate the SDT transmission. The SDT information includes at least one of the following items: an SDT indicator to indicate that SDT transmission is expected; a single packet indicator to indicate that no subsequent SDT transmission is expected; a multiple-packet indicator to indicate that subsequent SDT transmission is expected. In some implementations, the SDT information here may not need to contain all of the SDT information received from the gNB-CU, for example, it may contain only part of the received information, such as only contains the SDT indicator. In step 904a.2, the gNB-DU sends an RRC paging message to the UE to page the corresponding UE.

Regarding Option 2 (920), in step 904b, the gNB-DU sends an RRC paging message to the UE to page the corresponding UE for SDT transmission, including SDT information in the message. The SDT information includes at least one of the following items: an SDT indicator to indicate that SDT transmission is expected; a single packet indicator to indicate that no subsequent SDT transmission is expected; a multiple-packet indicator to indicate that subsequent SDT transmission is expected. In some implementations, the SDT information here may not need to contain all of the SDT information received from the gNB-CU, for example, it may contain only part of the received information, such as only contains the SDT indicator.

In some implementations, after receiving the RRC paging message, when the UE receives the SDT information from the RRC paging message/or PEI message, the UE may decide to resume UE with inactive state for SDT transmission.

In some implementations, when the UE is configured with the reserved cell group (CG) resource and the UE receives an multiple-packets indicator in the SDT information, the UE may prefer to use the reserved CG resources for SDT data transmission; and/or when the UE receives a single packet indicator in the SDT information, the UE may prefer to use random-access channel (RACH) resources for SDT data transmission.

Referring to step 905, the UE sends a RRC resume request message to the gNB-DU, including the SDT indicator to indicate that SDT transmission is expected in the message to request resuming UE with inactive state for SDT transmission.

Referring to step 906, the UE is resuming at the gNB with the RRC inactive state, and transmitting/receiving subsequent SDT data between the UE and the gNB via a RACH or CG resource.

VI. Embodiments for Transmitting DL SDT Triggered by Neighbour gNB

Figure 10:
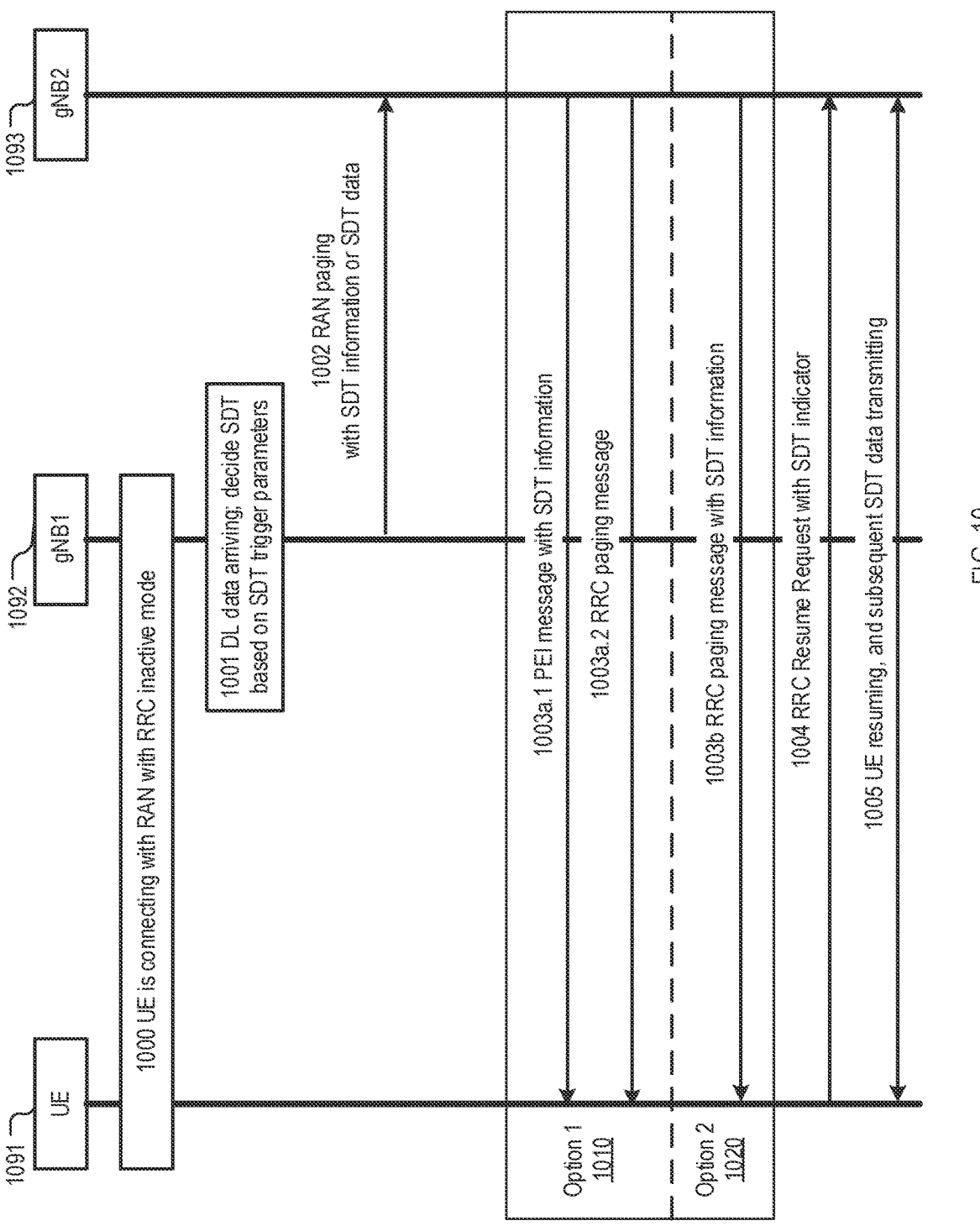
FIG. 10 shows a flow diagram of an exemplary embodiment for wireless communication.

FIG. 10 shows a non-limiting exemplary example for initiating and transmitting a downlink (DL) SDT triggered by a neighbour gNB. Referring to step 1000, a UE 1091 is connecting with a RAN with RRC inactive mode. The RAN may be a first gNB (gNB1, 1092), and a neighbor gNB (gNB2, 1093). The gNB1 is the last serving gNB.

Referring to step 1001, when DL data of the bearer(s) configured with SDT arrives for the UE in RRC inactive state at the gNB1, the gNB1 may determine whether to use SDT transmission or not for the UE according to the stored SDT trigger parameters. When a configured data volume threshold for the UE is present, the gNB1 may determine to use SDT transmission when the arrived data volume of all bearer(s) configured with SDT of such UE is less than (or no larger than) the corresponding configured threshold; and/or when a configured data volume threshold for a PDU session is present, the gNB1 may determine to use SDT transmission when the arrived data volume of all bearer(s) configured with SDT of such PDU session is less than (or no larger than) the corresponding configured threshold; and/or when a configured data volume threshold for a bearer configured with SDT is present, the gNB1 may determine to use SDT transmission when the arrived data volume of such SDT bearer is less than (no larger than) the corresponding configured threshold. In some implementations, the SDT trigger parameters may be configured in the gNB1 by an operations, administration and maintenance (OAM) unit.

Referring to step 1002, when the gNB1 decides to use SDT transmission for the UE, gNB1 sends a RAN paging message to the neighbour gNB2 to inform the gNB2 to page the corresponding UE for SDT transmission, including SDT information in the message. The SDT information includes at least one of the following items: an SDT indicator to indicate that SDT transmission is expected; a single packet indicator to indicate that no subsequent SDT transmission is expected; a multiple-packet indicator to indicate that subsequent SDT transmission is expected. The gNB1 may decide the items of the SDT information. The gNB1 may include the SDT indicator when it decides to use SDT transmission; the gNB1 may include a single packet indicator when only one packet needed to transmitted to UE; and/or the gNB1 may include a multiple-packet indicator when multiple packets needed to transmitted to the UE.

Optionally in some implementations, the gNB1 may include some received SDT data (PDCP PDU(s) for the bearer(s) configured with SDT) into the RAN paging message.

There may be two options (or alternatives) for the gNB2 to communicate the SDT information to the UE: Option 1, the gNB2 includes the SDT information in a paging early indication (PEI) message; and Option 2, the gNB2 includes the SDT information in a RRC paging message.

Referring to Option 1 (1010), in step 1003a.1, after receiving the RAN paging message, the gNB2 sends a PEI message to the UE before paging the UE, including SDT information in PEI message to indicate SDT transmission. The SDT information includes at least one of the following items: an SDT indicator to indicate that SDT transmission is expected; a single packet indicator to indicate that no subsequent SDT transmission is expected; a multiple-packet indicator to indicate that subsequent SDT transmission is expected. In some implementations, the SDT information here may not need to contain all of the SDT information received from the gNB1, for example, it may contain only part of the received information, such as only contains the SDT indicator. In step 1003a.2, the gNB2 sends an RRC paging message to the UE to page the corresponding UE.

Regarding Option 2 (920), in step 1003b, the gNB2 sends a RRC paging message to the UE to page the corresponding UE for SDT transmission, including SDT information in the message. The SDT information includes at least one of the following items: an SDT indicator to indicate that SDT transmission is expected; a single packet indicator to indicate that no subsequent SDT transmission is expected; a multiple-packet indicator to indicate that subsequent SDT transmission is expected. In some implementations, the SDT information here may not need to contain all of the SDT information received from the gNB1, for example, it may contain only part of the received information, such as only contains the SDT indicator.

In some implementations, after receiving the RRC paging message, when the UE receives SDT information from the RRC paging message/or PEI message, UE may decide to resume UE with inactive state for SDT transmission.

In some implementations, when the UE is configured with the reserved CG resource and the UE receives multiple packets indicator in SDT information, the UE may prefer to use reserved CG resources for SDT data transmission; and/or when the UE receives a single packet indicator in the SDT information, the UE may prefer to use random-access channel (RACH) resources for SDT data transmission.

Referring to step 1004, the UE sends a RRC resume request to the gNB2 including an SDT indicator to indicate SDT transmission is expected in the message to request resuming UE with inactive state for SDT transmission.

Referring to step 1005, the UE is resuming at the gNB2 with RRC inactive state, and transmitting/receiving subsequent SDT data between the UE and the gNB2 via the RACH or CG resource.

VII. Embodiments for Transmitting DL SDT Triggered by NAS Transmitting

Figure 11:
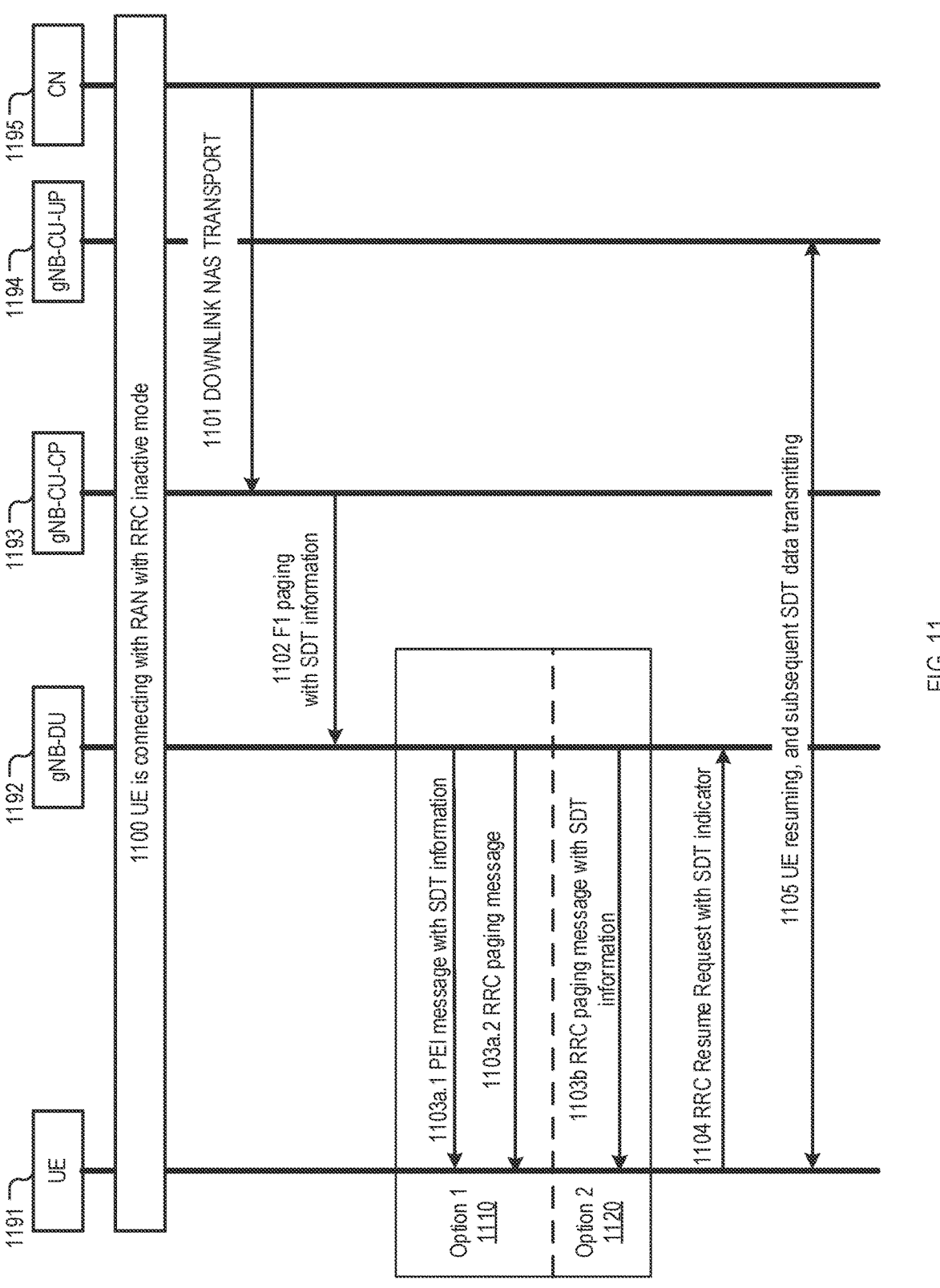
FIG. 11 shows a flow diagram of an exemplary embodiment for wireless communication.

FIG. 11 shows a non-limiting exemplary example for initiating and transmitting a downlink (DL) SDT triggered by a NAS transmitting. Referring to step 1100, a UE 1191 is connecting with a RAN with RRC inactive mode. The RAN may include a gNB-DU 1192, a gNB-CU-CP 1193, a gNB-CU-UP 1194, connecting with a core network (CN, 1195).

Referring to step 1101, the CN can send a DOWNLINK NAS TRANSPORT message to request to transfer a non-access stratum (NAS) PDU to the UE, including the NAS PDU in the message. the CN can also include a single NAS PDU indicator to indicate that no subsequent NAS PDU transmission is expected; and/or a multiple NAS PDU indicator to indicate that subsequent NAS PDU transmission is expected in the message.

Referring to step 1102, after receiving DOWNLINK NAS TRANSPORT message(s) sent by the CN, the gNB-CU-CP may decide to use SDT transmission for the UE. The gNB-CU-CP sends a F1 paging message to the gNB-DU to inform the DU to page the corresponding UE for the SDT transmission, including SDT information in the message. The gNB-CU-CP may decide the items of the SDT information. The gNB-CU-CP may include a SDT indicator when it decides to use SDT transmission; the gNB-CU-CP may include a single packet indicator when only one NAS PDU is needed to be transmitted to the UE; and/or the gNB-CU-CP may include a multiple-packet indicator when multiple NAS PDUs are needed to be transmitted to the UE.

There may be two options (or alternatives) for the gNB-DU to communicate the SDT information to the UE: Option 1, the gNB-DU includes the SDT information in a paging early indication (PEI) message; and Option 2, the gNB-DU includes the SDT information in an RRC paging message.

Regarding Option 1 (1110), in step 1103a.1, after receiving an F1 paging message, the gNB-DU sends a PEI message to the UE before paging the UE, including SDT information in the PEI message to indicate the SDT transmission. The SDT information includes at least one of the following items: an SDT indicator to indicate that SDT transmission is expected; a single packet indicator to indicate that no subsequent SDT transmission is expected; a multiple-packet indicator to indicate that subsequent SDT transmission is expected. In some implementations, the SDT information here may not need to contain all of the SDT information received from the gNB-CU, for example, it may contain only part of the received information, such as only contains the SDT indicator. In step 1103a.2, the gNB-DU sends an RRC paging message to the UE to page the corresponding UE.

Regarding Option 2 (1120), in step 1103b, the gNB-DU sends an RRC paging message to the UE to page the corresponding UE for SDT transmission, including SDT information in the message. The SDT information includes at least one of the following items: an SDT indicator to indicate that SDT transmission is expected; a single packet indicator to indicate that no subsequent SDT transmission is expected; a multiple-packet indicator to indicate that subsequent SDT transmission is expected. In some implementations, the SDT information here may not need to contain all of the SDT information received from the gNB-CU, for example, it may contain only part of the received information, such as only contains the SDT indicator.

In some implementations, after receiving the RRC paging message, when the UE receives the SDT information from the RRC paging message/or PEI message, the UE may decide to resume UE with inactive state for SDT transmission.

In some implementations, when the UE is configured with the reserved cell group (CG) resource and the UE receives an multiple-packets indicator in the SDT information, the UE may prefer to use the reserved CG resources for SDT data transmission; and/or when the UE receives a single packet indicator in the SDT information, the UE may prefer to use random-access channel (RACH) resources for SDT data transmission.

Referring to step 1104, the UE sends a RRC resume request message to the gNB-DU, including the SDT indicator to indicate that SDT transmission is expected in the message to request resuming UE with inactive state for SDT transmission.

Referring to step 1105, the UE is resuming at the gNB with the RRC inactive state, and transmitting/receiving subsequent SDT data between the UE and the gNB via a RACH or CG resource.

VIII. Embodiments for Transmitting DL SDT Triggered by CN Via User Plane

Figure 12:
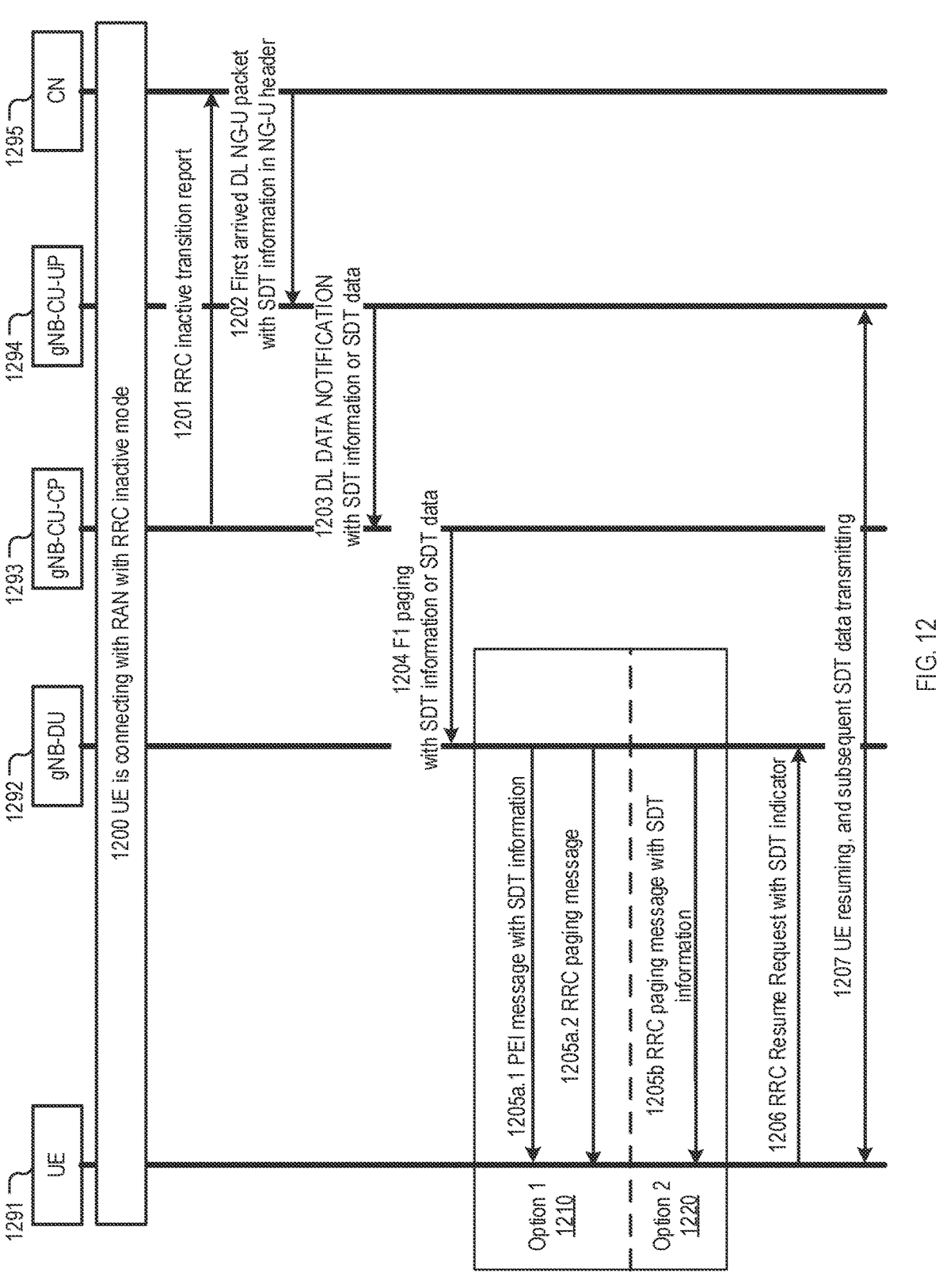
FIG. 12 shows a flow diagram of an exemplary embodiment for wireless communication.

FIG. 12 shows a non-limiting exemplary example for initiating and transmitting a downlink (DL) SDT triggered by a CN via user plane (UP). Referring to step 1200, a UE 1291 is connecting with an RAN with an RRC inactive mode (i.e., the UE is in a RRC inactive state). The RAN may include one or more gNB-DU 1292, one or more gNB-CU-CP 1293, and one or more gNB-CU-UP 1294, connecting to a core network (CN, 1295).

Referring to step 1201, the gNB-CU-CP can send an RRC inactive transition report message to the CN to indicate that the UE is in RRC inactive state. therefore, the CN is aware of the UE being in RRC inactive state.

Referring to step 1202, when DL data arrives for the UE in RRC inactive state at the CN, the CN decides to use SDT transmission when the arrived data volume is less than (or no larger than) the configured threshold, the CN sends the NG-U packet to the gNB-CU-UP, including SDT information in the header of the first NG-U packet to request resuming UE for SDT transmission. The SDT information includes at least one of the following items: an SDT indicator to indicate that SDT transmission is expected; a single packet indicator to indicate that no subsequent SDT transmission is expected; a multiple-packet indicator to indicate that subsequent SDT transmission is expected.

In some implementations, the CN may decide the items of the SDT information. The CN may include the SDT indicator when it decides to use SDT transmission; the CN may include a single packet indicator when only one packet needed to transmitted to UE; and/or the CN may include a multiple-packet indicator when multiple packets needed to transmitted to the UE.

Referring to step 1203, after the gNB-CU-UP receives the SDT information in the NG-U packet header, the gNB-CU-UP sends a DL DATA NOTIFICATION message to the gNB-CU-CP to inform DL data arriving, including SDT information in the message to request resuming UE for SDT transmission. The SDT information includes at least one of the following items: an SDT indicator to indicate that SDT transmission is expected; a single packet indicator to indicate that no subsequent SDT transmission is expected; a multiple-packet indicator to indicate that subsequent SDT transmission is expected. In some implementations, the SDT information here may not need to contain all of the SDT information received from the CN, for example, it may contain only part of the received information, such as only contains the SDT indicator.

Optionally in some implementations, the gNB-CU-UP may include some received SDT data (PDCP PDU(s) for the bearer(s) configured with SDT) into the DL DATA NOTIFICATION message.

Referring to step 1204, after receiving the DL DATA NOTIFICATION message(s) sent by the CN, when SDT information is present in the DL DATA NOTIFICATION message, the gNB-CU-CP sends an F1 paging message to the gNB-DU to inform the DU to page the corresponding UE for SDT transmission, including SDT information in the message. The SDT information includes at least one of the following items: an SDT indicator to indicate that SDT transmission is expected; a single packet indicator to indicate that no subsequent SDT transmission is expected; a multiple-packet indicator to indicate that subsequent SDT transmission is expected. In some implementations, the SDT information here may not need to contain all of the SDT information received from the gNB-CU-UP, for example, it may contain only part of the received information, such as only contains the SDT indicator.

Optionally in some implementations, the gNB-CU-UP may include some SDT data (PDCP PDU(s) for the bearer(s) configured with SDT) received from the gNB-CU-UP via the DL DATA NOTIFICATION message into the F1 paging message.

There may be two options (or alternatives) for the gNB-DU to communicate the SDT information to the UE: Option 1, the gNB-DU includes the SDT information in a paging early indication (PEI) message; and Option 2, the gNB-DU includes the SDT information in an RRC paging message.

Regarding Option 1 (1210), in step 1205a.1, after receiving an F1 paging message, the gNB-DU sends a PEI message to the UE before paging the UE, including SDT information in the PEI message to indicate the SDT transmission. The SDT information includes at least one of the following items: an SDT indicator to indicate that SDT transmission is expected; a single packet indicator to indicate that no subsequent SDT transmission is expected; a multiple-packet indicator to indicate that subsequent SDT transmission is expected. In some implementations, the SDT information here may not need to contain all of the SDT information received from the gNB-CU, for example, it may contain only part of the received information, such as only contains the SDT indicator. In step 1205a.2, the gNB-DU sends an RRC paging message to the UE to page the corresponding UE.

Regarding Option 2 (1220), in step 1205b, the gNB-DU sends an RRC paging message to the UE to page the corresponding UE for SDT transmission, including SDT information in the message. The SDT information includes at least one of the following items: an SDT indicator to indicate that SDT transmission is expected; a single packet indicator to indicate that no subsequent SDT transmission is expected; a multiple-packet indicator to indicate that subsequent SDT transmission is expected. In some implementations, the SDT information here may not need to contain all of the SDT information received from the gNB-CU, for example, it may contain only part of the received information, such as only contains the SDT indicator.

In some implementations, after receiving the RRC paging message, when the UE receives the SDT information from the RRC paging message/or PEI message, the UE may decide to resume UE with inactive state for SDT transmission.

In some implementations, when the UE is configured with the reserved cell group (CG) resource and the UE receives an multiple-packets indicator in the SDT information, the UE may prefer to use the reserved CG resources for SDT data transmission; and/or when the UE receives a single packet indicator in the SDT information, the UE may prefer to use random-access channel (RACH) resources for SDT data transmission.

Referring to step 1206, the UE sends a RRC resume request message to the gNB-DU, including the SDT indicator to indicate that SDT transmission is expected in the message to request resuming UE with inactive state for SDT transmission.

Referring to step 1207, the UE is resuming at the gNB with the RRC inactive state, and transmitting/receiving subsequent SDT data between the UE and the gNB via a RACH or CG resource.

IX. Embodiments for Transmitting DL SDT Triggered by CN Via Control Plane

Figure 13:
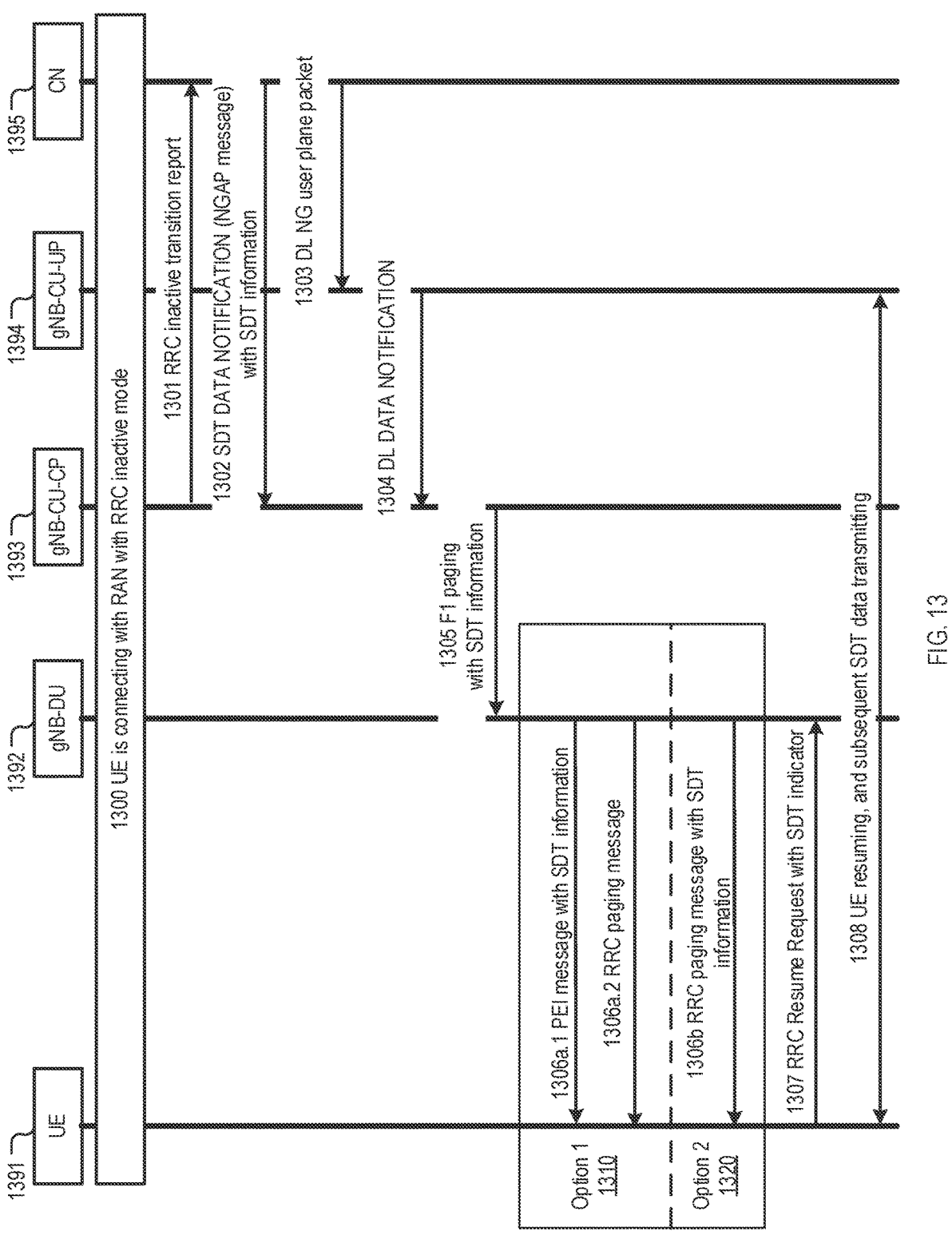
FIG. 13 shows a flow diagram of an exemplary embodiment for wireless communication.

FIG. 13 shows a non-limiting exemplary example for initiating and transmitting a downlink (DL) SDT triggered by a CN via a control plane (CP). Referring to step 1300, a UE 1391 is connecting with an RAN with an RRC inactive mode (i.e., the UE is in a RRC inactive state). The RAN may include one or more gNB-DU 1392, one or more gNB-CU-CP 1393, and one or more gNB-CU-UP 1394, connecting to a core network (CN, 1395).

Referring to step 1301, the gNB-CU-CP can send an RRC inactive transition report message to the CN to indicate that the UE is in RRC inactive state. therefore, the CN is aware of the UE being in RRC inactive state.

Referring to step 1302, when DL data arrives for the UE in RRC inactive state at the CN, the CN decide to use SDT transmission when the arrived data volume is less than (or no larger than) the configured threshold, the CN sends a NG application protocol (NAGP) message, e.g., an SDT DATA NOTIFICATION, to the gNB-CU-CP to inform DL SDT data arriving, including SDT information in the message to request resuming UE for SDT transmission. The SDT information includes at least one of the following items: an SDT indicator to indicate that SDT transmission is expected; a single packet indicator to indicate that no subsequent SDT transmission is expected; a multiple-packet indicator to indicate that subsequent SDT transmission is expected. In some implementations, the CN may decide the items of the SDT information. The CN may include the SDT indicator when it decides to use SDT transmission; the CN may include a single packet indicator when only one packet needed to transmitted to UE; and/or the CN may include a multiple-packet indicator when multiple packets needed to transmitted to the UE.

Referring to step 1303, when there are multiple packets needed to be transmitted to the UE, the CN may send the subsequent SDT data via one or more NG-U packet to the gNB-CU-UP.

Referring to step 1304, after the gNB-CU-UP receiving the NG-U packet sent by CN, gNB-CU-UP sends a DL DATA NOTIFICATION message to the gNB-CU-CP to notify that there are data arrived for the UE.

Referring to step 1305, after receiving the DL DATA NOTIFICATION message(s) sent by the CN, when SDT information is present in the DL DATA NOTIFICATION message, the gNB-CU-CP sends an F1 paging message to the gNB-DU to inform the DU to page the corresponding UE for SDT transmission, including SDT information in the message. The SDT information includes at least one of the following items: an SDT indicator to indicate that SDT transmission is expected; a single packet indicator to indicate that no subsequent SDT transmission is expected; a multiple-packet indicator to indicate that subsequent SDT transmission is expected. In some implementations, the SDT information here may not need to contain all of the SDT information received from the CN, for example, it may contain only part of the received information, such as only contains the SDT indicator.

There may be two options (or alternatives) for the gNB-DU to communicate the SDT information to the UE: Option 1, the gNB-DU includes the SDT information in a paging early indication (PEI) message; and Option 2, the gNB-DU includes the SDT information in an RRC paging message.

Regarding Option 1 (1310), in step 1306*a*.1, after receiving an F1 paging message, the gNB-DU sends a PEI message to the UE before paging the UE, including SDT information in the PEI message to indicate the SDT transmission. The SDT information includes at least one of the following items: an SDT indicator to indicate that SDT transmission is expected; a single packet indicator to indicate that no subsequent SDT transmission is expected; a multiple-packet indicator to indicate that subsequent SDT transmission is expected. In some implementations, the SDT information here may not need to contain all of the SDT information received from the gNB-CU, for example, it may contain only part of the received information, such as only contains the SDT indicator. In step 1306*a*.2, the gNB-DU sends an RRC paging message to the UE to page the corresponding UE.

Regarding Option 2 (1320), in step 1306*b*, the gNB-DU sends an RRC paging message to the UE to page the corresponding UE for SDT transmission, including SDT information in the message. The SDT information includes at least one of the following items: an SDT indicator to indicate that SDT transmission is expected; a single packet indicator to indicate that no subsequent SDT transmission is expected; a multiple-packet indicator to indicate that subsequent SDT transmission is expected. In some implementations, the SDT information here may not need to contain all of the SDT information received from the gNB-CU, for example, it may contain only part of the received information, such as only contains the SDT indicator.

In some implementations, after receiving the RRC paging message, when the UE receives the SDT information from the RRC paging message/or PEI message, the UE may decide to resume UE with inactive state for SDT transmission.

In some implementations, when the UE is configured with the reserved cell group (CG) resource and the UE receives an multiple-packets indicator in the SDT information, the UE may prefer to use the reserved CG resources for SDT data transmission; and/or when the UE receives a single packet indicator in the SDT information, the UE may prefer to use random-access channel (RACH) resources for SDT data transmission.

Referring to step 1307, the UE sends a RRC resume request message to the gNB-DU, including the SDT indicator to indicate that SDT transmission is expected in the message to request resuming UE with inactive state for SDT transmission.

Referring to step 1308, the UE is resuming at the gNB with the RRC inactive state, and transmitting/receiving subsequent SDT data between the UE and the gNB via a RACH or CG resource.

The present disclosure describes methods, apparatus, and computer-readable medium for wireless communication. The present disclosure addressed the issues with configuring small data transmission. The methods, devices, and computer-readable medium described in the present disclosure may facilitate the performance of wireless communication by configuring small data transmission, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:
   receiving, from a first network node by a second network node, a paging message, the paging message configured to request the second network node to page a user equipment (UE) for a small data transmission (SDT) transmission, wherein the paging message comprises SDT information,
   paging, by the second network node, the UE for the SDT transmission according to the SDT information; and
   in response to sending a radio resource control (RRC) paging message to the UE, receiving, by the second network node, a RRC resume request message from the UE, the RRC resume request message comprising a SDT indicator to request resuming the UE in an inactive state for the SDT transmission.

2. The method according to claim 1, wherein:

the first network node is a control unit of a base station (gNB-CU) and the second network node is a distributed unit of the base station (gNB-DU); or the first network node is a first gNB and the second network node is a second gNB.

3. The method according to claim 1, wherein:

the SDT information comprises the SDT indicator indicating that the SDT transmission is expected.

4. A method for wireless communication, comprising:

receiving, by a user equipment (UE), a radio resource control (RRC) paging message from a network node;

in response to the RRC paging message comprising small data transmission (SDT) information, performing, by the UE, SDT procedure by:

sending, by the UE, a RRC resume request message to the network node, the RRC resume request message comprising an SDT indicator to request resuming the UE in an inactive state for the SDT transmission.

5. The method according to claim 4, wherein:

the SDT information comprises the SDT indicator indicating that the SDT transmission is expected.

6. The method according to claim 4, wherein:

the network node is one of a distributed unit of a base station (gNB-DU) or a gNB.

7. A network node comprising:

a memory storing instructions; and at least one processor in communication with the memory, wherein, when the at least one processor executes the instructions, the at least one processor is configured to cause the network node to:

receive, from another network node, a paging message, the paging message configured to request the network node to page a user equipment (UE) for a small data transmission (SDT) transmission, wherein the paging message comprises SDT information, page the UE for the SDT transmission according to the SDT information, and in response to sending a RRC paging message to the UE, receive a RRC resume request message from the UE, the RRC resume request message comprising a SDT indicator to request resuming the UE in an inactive state for the SDT transmission.

8. The network node according to claim 7, wherein:

the another network node is a control unit of a base station (gNB-CU) and the network node is a distributed unit of the base station (gNB-DU); or the another network node is a first gNB and the network node is a second gNB.

9. The network node according to claim 7, wherein:

the SDT information comprises the SDT indicator indicating that the SDT transmission is expected.

10. A device for wireless communication, comprising:

a memory storing instructions; and at least one processor in communication with the memory, wherein, when the at least one processor executes the instructions, the at least one processor is configured to cause the device to:

receive a radio resource control (RRC) paging message from a network node; and in response to the RRC paging message comprising small data transmission (SDT) information, perform SDT procedure by:

sending a RRC resume request message to the network node, the RRC resume request message comprising an SDT indicator to request resuming the device in an inactive state for the SDT transmission.

11. The device according to claim 10, wherein:

the SDT information comprises the SDT indicator indicating that the SDT transmission is expected.

12. The device according to claim 10, wherein:

the network node is one of a distributed unit of a base station (gNB-DU) or a gNB.

\* \* \* \* \*